US012674320B2

(12) United States Patent (10) Patent No.: US 12,674,320 B2
Memari et al. (45) Date of Patent: Jul. 7, 2026

(54) REINFORCED COMPOSITE MATERIALS, AND METHODS OF MAKING THE SAME

(71) Applicant: THE PENN STATE RESEARCH FOUNDATION, University Park, PA (US)

(72) Inventors: Ali M. Memari, State College, PA (US); Maryam Hojati, Albuquerque, NM (US); Jose Manuel Pinto Duarte, Boalsburg, PA (US); Shadi Nazarian, State College, PA (US); Aleksandra Radlinska, Lemont, PA (US); Sven Bilen, State College, PA (US); Nicholas Meisel, State College, PA (US)

(73) Assignee: The Penn State Research Foundation

( * ) Notice: Subject to any disclaimer, the term of this patent is extended or adjusted under 35 U.S.C. 154(b) by 889 days.

(21) Appl. No.: 17/353,626

(22) Filed: Jun. 21, 2021

(65) Prior Publication Data

US 2021/0396012 A1 Dec. 23, 2021

Related U.S. Application Data

(60) Provisional application No. 63/041,394, filed on Jun. 19, 2020, provisional application No. 63/041,351, filed on Jun. 19, 2020.

(51) Int. Cl.
E04B 1/16 (2006.01)
B21F 45/00 (2006.01)
(Continued)

(52) U.S. Cl.
CPC ............ E04C 5/012 (2013.01); B21F 45/006 (2013.01); B33Y 70/00 (2014.12); B33Y 80/00 (2014.12);
(Continued)

(58) Field of Classification Search
CPC .......... E04B 11/165; E04C 5/012; E04C 5/03; E04C 5/073; E04C 5/125; B21F 45/006; B33Y 80/00
See application file for complete search history.

(56) References Cited

U.S. PATENT DOCUMENTS

| | | | | |
|---|---|---|---|---|
| 4,372,733 A | * | 2/1983 | Tinning | E04G 11/04 |
| | | | | 264/32 |
| 6,560,938 B1 | * | 5/2003 | Powers, Jr. | E04C 3/02 |
| | | | | 52/204.2 |

(Continued)

FOREIGN PATENT DOCUMENTS

| | | | | |
|---|---|---|---|---|
| CN | 104153493 A | * | 11/2014 | E04B 2/086 |
| JP | H0629805 | * | 4/1994 | |

(Continued)

OTHER PUBLICATIONS

Machine Translation of JP H0629805 (Year: 2024).*

(Continued)

*Primary Examiner* — Ryan D Kwiecinski
(74) *Attorney, Agent, or Firm* — BUCHANAN INGERSOLL & ROONEY PC

(57) ABSTRACT

Embodiments of the disclosure provide a reinforced composite material including a composite material forming a geometric body, and a reinforcement member disposed in the composite material. In some embodiments, the reinforcement member includes (i) at least one elongate metal wire extending at least partially through the composite material, and (ii) at least one barb that extends from the elongate metal wire in a transverse direction to the elongate metal wire.

20 Claims, 6 Drawing Sheets
(5 of 6 Drawing Sheet(s) Filed in Color)

(51) Int. Cl.

| | |
|---|---|
| *B33Y 70/00* | (2020.01) |
| *B33Y 80/00* | (2015.01) |
| *C04B 14/10* | (2006.01) |
| *C04B 14/14* | (2006.01) |
| *C04B 18/14* | (2006.01) |
| *C04B 22/12* | (2006.01) |
| *C04B 28/04* | (2006.01) |
| *E04C 5/01* | (2006.01) |
| *B28B 1/00* | (2006.01) |
| *B33Y 10/00* | (2015.01) |
| *C04B 103/10* | (2006.01) |
| *C04B 103/30* | (2006.01) |
| *C04B 103/32* | (2006.01) |
| *C04B 111/00* | (2006.01) |

(52) U.S. Cl.
CPC .......... *C04B 14/104* (2013.01); *C04B 14/106* (2013.01); *C04B 14/14* (2013.01); *C04B 18/141* (2013.01); *C04B 18/146* (2013.01); *C04B 22/124* (2013.01); *C04B 28/04* (2013.01); *B28B 1/001* (2013.01); *B33Y 10/00* (2014.12); *C04B 2103/10* (2013.01); *C04B 2103/302* (2013.01); *C04B 2103/32* (2013.01); *C04B 2111/00181* (2013.01)

(56) References Cited

U.S. PATENT DOCUMENTS

| | | | | |
|---|---|---|---|---|
| 9,416,052 B2 * | 8/2016 | Feldman | .................. | C04B 28/04 |
| 10,074,449 B2 * | 9/2018 | White | .................. | H05K 9/0001 |
| 2018/0071949 A1 * | 3/2018 | Giles | ........................ | B28B 1/001 |
| 2020/0149269 A1 * | 5/2020 | Crump | ..................... | D04B 1/00 |
| 2021/0370546 A1 * | 12/2021 | Mayer | ................. | E04G 21/0463 |
| 2022/0274880 A1 * | 9/2022 | Pont | ....................... | B33Y 70/00 |
| 2024/0151050 A1 * | 5/2024 | Mehlomakulu | ......... | B28B 1/001 |

FOREIGN PATENT DOCUMENTS

| | | | | | |
|---|---|---|---|---|---|
| JP | H0629805 U | * | 4/1994 | | |
| KR | 101828285 B1 | * | 2/2018 | ............. | B28B 1/001 |

OTHER PUBLICATIONS

Bos et al., Additive Manufacturing of Concrete in Construction: Potentials and Challenges of 3D Concrete Printing, Virtual and Physical Prototyping, 2016, 11(3):209-225.

Buswell et al., 3D Printing Using Concrete Extrusion: A Roadmap for Research, Cement and Concrete Research, 2018, 112:37-49.

Cox et al., Expedient Reinforcement for Concrete for Use in Southeast Asia, Report 2—Preliminary Tests of Barbed Wire, Concertina Wire, Wire Rope, Landing Mat, and Landing Mat Tie Bars, Mar. 1970, 114 pages.

Hack et al., Mesh-Mould: Robotically Fabricated Spatial Meshes as Reinforced Concrete Formwork, Architectural Design, 2014, 84(3):44-53.

Hambach et al., Properties of 3D-Printed Fiber-Reinforced Portland Cement Paste, Cement and Concrete Composites, 2017, 79:62-70.

Har-Tru Sports, Har-Tru Safety Data Sheet, Mar. 27, 2015, 5 pages.

Hiwang et al., An Innovative Construction Process-Contour Crafting (CC), In 22nd International Symposium on Automation and Robotics in Construction, vol. 90111, ISARC, 2005, 6 pages.

Jutinov, 3D Concrete Printing, Research and Development of a Structural Reinforcement System for 3D Printing with Concrete, Graduation Thesis, Eindhoven University of Technology, 2017, 110 pages.

Kazemian et al., Cementitious Materials for Construction-Scale 3D Printing: Laboratory Testing of Fresh Printing Mixture, Construction and Building Materials, 2017, 145:639-647.

Khoshnevis, Automated Construction by Contour Crafting-Related Robotics and Information Technologies, Automation in Construction, 2004, 13(1):5-19.

Le et al., Mix Design and Fresh Properties for High-Performance Printing Concrete, Materials and Structures, 2012, 45(8):1221-1232.

Lim et al., Developments in Construction-Scale Additive Manufacturing Processes, Automation in Construction, 2012, 21:262-268.

Slager, Influence of the Interface Between Layers on the Tensile Properties of 3D-Printed Concrete, Graduation Thesis, 2017, Eindhoven University of Technology, 166 pages.

Tay et al., 3D Printing Trends in Building and Construction Industry: A Review, Virtual and Physical Prototyping, 2017, 12(3):261-276.

Tilcon, Material Safety Data Sheet—Crushed Stone, Sep. 2003, 6 pages.

Van Den Bulck, Assembling Structural 3D Concrete Printed Elements, Master Thesis, Eindhoven University of Technology, 2017 104 pages.

Van Zijl et al., Properties of 3D Printable Concrete, In Proceedings of the 2nd International Conference on Progress In Additive Manufacturing, 2016, pp. 421-426.

Wu et al., A Critical Review of the Use of 3-D Printing in the Construction Industry, Automation in Construction, 2016, 68:21-31.

\* cited by examiner

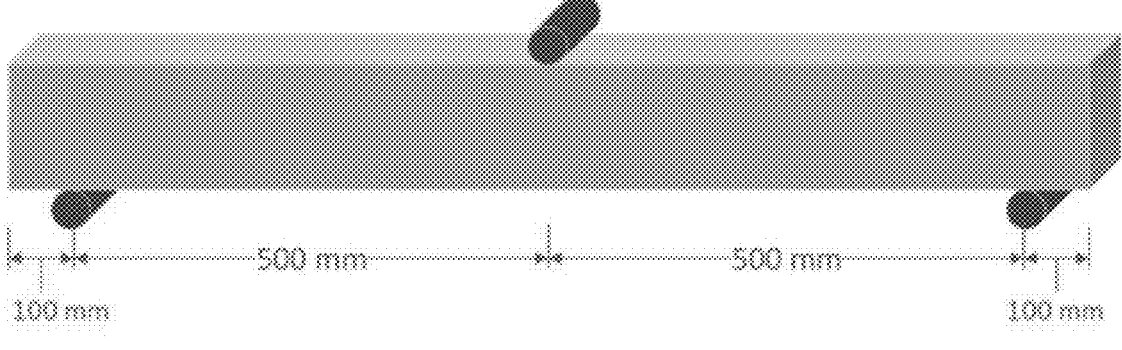
S11: Plain    Reinforced S12: 2R2C    Reinforced S13: 3R2C    Reinforced S14: 2R3C    Reinforced S15: 3R3C
FIG. 4
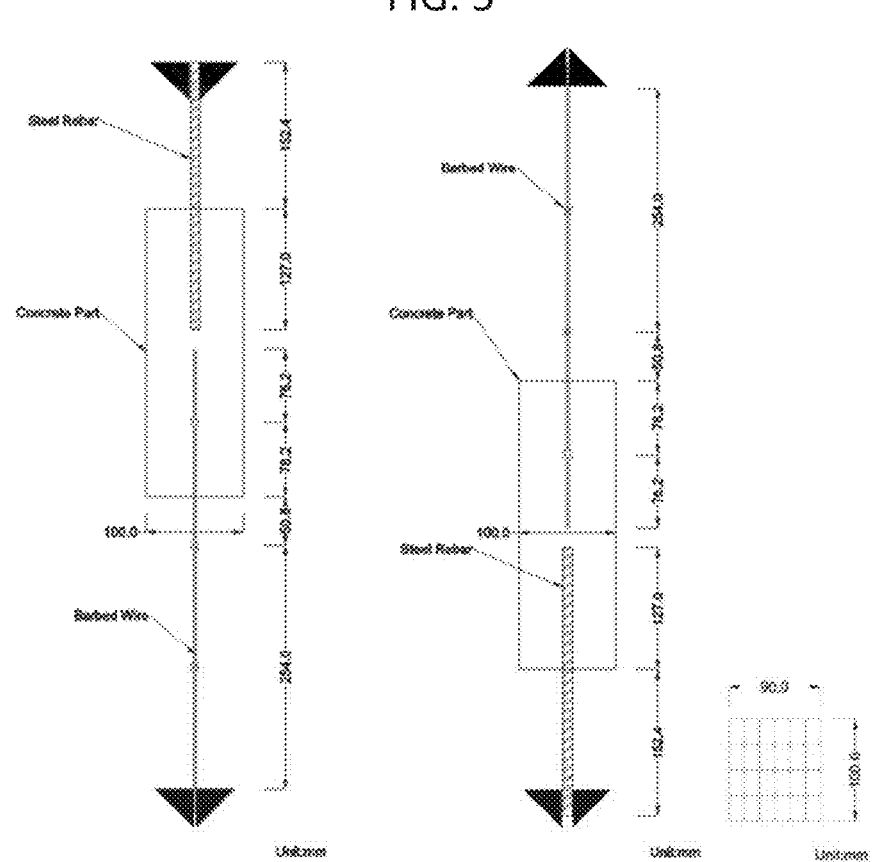
FIG. 5
FIG. 6

| Set 1 (300 mm x 80 mm x 90 mm beams) | | | |
|---|---|---|---|
| Plaine beam (S31) | Reinforced beam (1R1C) (S32) | Reinforced beam (2R1C) (S33) | Reinforced beam (1R3C) (S34) |
| Reinforced beam (2R3C) (S35) | | | |

| Set 2 (300 mm x 200 mm x 90 mm beams) | | | |
|---|---|---|---|
| Plaine beam (S31) | Reinforced beam (1R1C) (S32) | Reinforced beam (2R1C) (S33) | Reinforced beam (1R3C) (S34) |
| Reinforced beam (2R3C) (S35) | | | |

FIGS. 9(A-J)

REINFORCED COMPOSITE MATERIALS, AND METHODS OF MAKING THE SAME

CROSS-REFERENCE TO RELATED APPLICATION

This application claims priority under 35 U.S.C. § 119 to U.S. Provisional Application No. 63/041,394 filed Jun. 19, 2020 and to U.S. Provisional Application No. 63/041,351 filed Jun. 19, 2020, the entire contents of which are incorporated herein by reference.

STATEMENT CONCERNING FEDERALLY SPONSORED RESEARCH OR DEVELOPMENT

Not applicable.

FIELD OF THE INVENTION

This disclosure relates to reinforced composite materials, and methods of making the same.

BACKGROUND

Concrete is one of the most frequently used building materials. One virtue of concrete is its ability to be molded into shapes for various structural forms, such as beams, slabs, columns, walls, bases, and foundations. In addition to its structural versatility, concrete has exceptional compressive strength (e.g., from 17 MPa to 70 MPa). Although concrete is strong in compression, concrete is relatively weak in tension (e.g., concrete often has a tensile strength from 2 MPa to 5 MPa) and is subject to crack and fail under tension. For example, consider a beam supported at each end and carrying a load. Under this load, the concrete in the top layers will be compressed (shortened), but those in the bottom layer will be under tension (stretched). As the load increases, the beam deflects and cracks will occur in the bottom face, and it will eventually fail as the concrete is weak in tensile strength.

For this reason, when using concrete for structural forms, concrete can be reinforced to improve its tensile strength. Most commonly concrete is reinforced with rebar (rods of carbon steel). Rebar significantly increases the tensile strength of the structure. However, one drawback of rebar is that it can only be used in straight and not curved configurations. Further, printed concrete may not form proper bonds with rebar due to potential cold joint aspects. A cold joint is a term used to describe lack of bond between two different pours of concrete. For example, if a first batch of concrete is poured within a formwork, and half way through the first batch is used up, a lag period is created as a second batch of concrete is transferred to the formwork to be poured. If the lag period between the pours is long, the first batch sets and hardens, and the second batch may not bond as well to the first batch, creating a cold joint aspect. This is particularly relevant in the context of printed concrete, which sets fast and may not form proper bonds to steel rebars if embedded therein.

The art recognizes a need for new reinforcing materials that are suitable for reinforcing curved configurations, and the associated methods of implementing the same, while simultaneously maintaining proper tensile strength and bond strength for reinforcing concrete.

SUMMARY OF THE INVENTION

Some embodiments of the present disclosure provide a reinforced cementitious material comprising a cementitious material forming a geometric body comprising a plurality of printed filaments, and a reinforcement member disposed in the cementitious material. In some embodiments, the reinforcement member comprises at least one elongate metal wire extending at least partially through the composite material, and at least one barb that extends from the elongate metal wire in a transverse direction to the elongate metal wire.

In some embodiments, the reinforcement member is disposed between the printed filaments in the cementitious material. For example, the reinforcement member may be positioned between two printed filaments that are vertically stacked or arranged horizontally next to one another.

In some embodiments, the cementitious material comprises a cement binder, an aggregate, at least one pozzolanic additive, an accelerator, water, and nanoclay.

In some embodiments, the reinforcement member comprises a plurality of barbs along the length of the at least one elongate metal wire.

In some embodiments, the reinforcement member is disposed between a first printed filament and a second printed filament in the cementitious material, where the second printed filament is configured adjacent to the first printed filament, and where at least a portion the plurality of barbs extends from the elongate metal wire to project into the second printed filament, and at least a portion of the plurality of barbs extends into the first printed filament.

In some embodiments, the barbs have a barb spacing from 1 cm to 50 cm.

In some embodiments, the barbs at least partially wrap around the at least one elongate metal wire.

In some embodiments, the reinforcement member comprises at least two elongate metal wires helically twisted along the length of the elongate metal wires. In some embodiments, the at least two elongate metal wires comprise from 2 to 50 nodes between the barbs. In some embodiments, some or all the barbs wrap between the at least two elongate metal wires. In some embodiments, some or all of the barbs wrap around the outside of the at least two elongate metal wires.

In some embodiments, the cementitious material completely surrounds the at least one elongate metal wire and the at least one barb.

In some embodiments, the cementitious material comprises a plurality of the reinforcement members disposed therein.

In some embodiments, the reinforcement member comprises a curved structure within the cementitious material.

In some embodiments, the reinforced cementitious material has one or more configuration selected from: (i) from 2 to 500 rows of reinforcement members disposed within the composite material; or (ii) from 2 to 500 columns of reinforcement members disposed within the composite material.

In some embodiments, the reinforced cementitious material has one or more of the following properties: (i) a modulus of rupture from 6 MPa to 15 MPa; or (ii) a bond strength between the reinforcement member and the composite material of at least 1100 MPa.

In some embodiments, the present disclosure provides a method. The method includes (i) depositing a first filament of a cementitious material on a printing surface from a nozzle of a print head, and (ii) contacting a reinforcement member to a surface of the first filament, where the reinforcement member comprises at least one elongate metal wire and at least one barb that extends from the elongate metal wire in a transverse direction to the elongate metal wire. The method further includes (iii) depositing at least one additional filament of the cementitious material atop the first filament thereby forming a three-dimensional structure.

In some embodiments, the method further includes contacting the reinforcement member with the first filament while concurrently depositing a second filament of the cementitious material atop the first filament.

In some embodiments, a spool is connected to the print head and the reinforcement member is wrapped around the spool. The spool may be configured to deposit the reinforcement member onto the cementitious material such that the reinforcement member is positioned between the first filament and the at least one additional filament of the cementitious material. In some embodiments, the spool may be configured to deposit the reinforcement member ahead or behind of the nozzle that deposits the cementitious material.

In some embodiments, the method further includes continuously feeding the reinforcement member concurrently with depositing of the at least one additional filament of the cementitious material.

In some embodiments, the method further includes contacting a plurality of the reinforcement members to a surface of the first filament of the cementitious material.

In some embodiments, the flow of the first filament on the printing surface is continuous so that a non-interrupted printing of the cementitious material forms along a path defined by movement of the print head.

In some embodiments, the method includes printing on a curved printing surface.

In some embodiments, the method includes printing the cementitious material, which is composed of a cement binder, an aggregate, at least one pozzolanic additive, an accelerator, water, and nanoclay. In some embodiments, each component is present in a sufficient amount such that the at least one additional filament can be printed atop the first printed filament to form the three-dimensional structure.

In some embodiments, the method includes printing a first printed filament and at least one additional filament, which are substantially free of cracks on the outer surface of the filament for at least one day to one week following deposition.

In some embodiments, the method includes printing a cementitious material comprising from 15 wt % to 40 wt % of the cement binder, based on the total weight of the cementitious material. In some embodiments, the method includes printing a cementitious material comprising from 35 wt % to 60 wt % of the aggregate, based on the total weight of the cementitious material. In some embodiments, the method includes printing a cementitious material comprising from 3 wt % to 20 wt % of the at least one pozzolanic additive, based on the total weight of the cementitious material.

In some embodiments, the pozzolanic additive includes from 0.5 wt % to 5 wt % silica fume, based on the total weight of the printable composition; from 1 wt % to 20 wt % slag, based on the total weight of the printable composition, and from 0.5 wt % to 6 wt % metakaolin, based on the total weight of the cementitious material.

In some embodiments, the method includes printing a cementitious material comprising from 0.1 wt % to 1.5 wt % of the accelerator, based on the total weight of the cementitious material. In some embodiments, the method includes printing a cementitious material comprising from 0.01 wt % to 5 wt % nanoclay.

In some embodiments, the method includes printing a cementitious material having one or more of the following properties: (a) a flow table test from 15 cm to 20 cm; (b) an initial set time from 50 to 180 minutes; (c) a final set time from 80 to 300 minutes; (d) a fresh density from 2.0 to 2.4 $g/cm^3$; (e) a 2-day strength from 10 MPa to 55 MPa; or (f) a 28-day strength from 25 MPa to 85 MPa.

In some embodiments, the method includes contacting a reinforcement member to a surface of the first filament, where the reinforcement member comprises a plurality of barbs along a length of the at least one elongate wire. In some embodiments, following step (iii) the reinforcement member is disposed between a first printed filament and a second printed filament in the cementitious material such that at least a portion the plurality of barbs extends from the elongate metal wire to project into both the first printed filament and the at least one additional printed filament.

In some embodiments, the reinforcement member comprises at least two elongate metal wires helically twisted along the length of the elongate metal wires. In some embodiments, some or all the barbs wrap between the at least two elongate metal wires. In some embodiments, some or all of the barbs wrap around the outside of the at least two elongate metal wires.

In some embodiments, the present disclosure provides a three-dimensional printing system. The three-dimensional printing system includes a print head having a nozzle for depositing a cementitious material on a printing surface. The print head is connected to a multi-motor stepper configured to move the print head in three dimensions. The three-dimensional printing system further includes a spool comprising a reinforcement member wound around the spool, where the reinforcement member comprises at least one elongate metal wire and at least one barb that extends from the elongate metal wire in a transverse direction to the elongate metal wire. The spool is further configured to deposit the reinforcement member onto the cementitious material. In some embodiments, the spool is configured to deposit the reinforcement member ahead or behind of the nozzle that deposits the cementitious material.

In some embodiments, the spool is connected to the print head.

In some embodiments, the print head had a plurality of nozzles configured to dispense the cementitious material.

In some embodiments, the three-dimensional printing system includes a controller in electrical communication with the print head, where the controller is programmed to regulate the flow rate of the cementitious material through the print head.

In some embodiments, the controller is in electrical communication with the spool, where the controller is programmed to regulate the rotation rate of the spool to control the deposition speed of the reinforcement material.

These and other advantages and features of the invention will become more apparent from the following detailed description of the preferred embodiments of the invention when viewed in conjunction with the accompanying drawings.

DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 are schematic illustrations of different configurations of reinforcement members positioned within composite materials in accordance with some embodiments of the present disclosure.

FIG. 5 is a three-point flexural test set-up used for determining flexural strength in accordance with some embodiments of the present disclosure.

FIG. 6 is a pull-out test set-up used for determining bond strength between the reinforcement member and the composite materials in accordance with some embodiments of the present disclosure.

DETAILED DESCRIPTION

Figure 1:
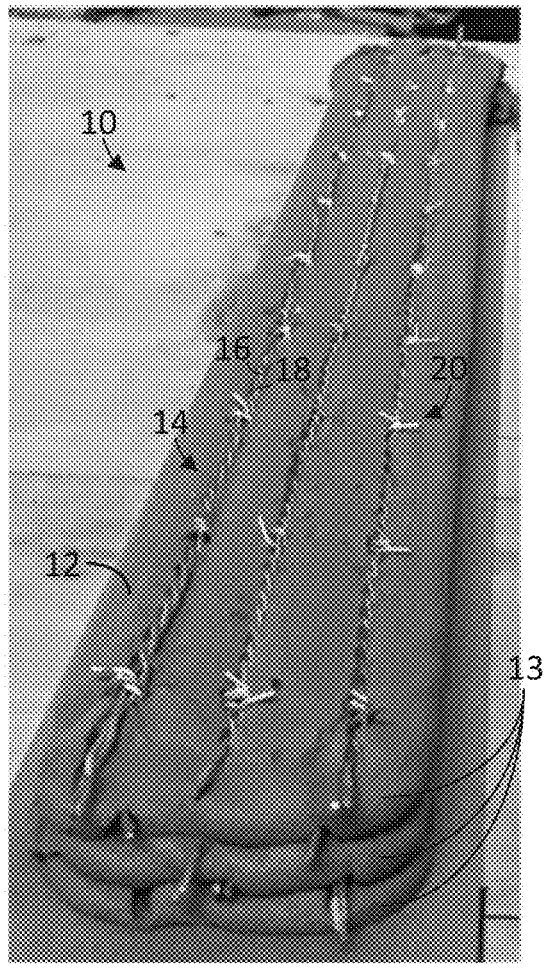
FIG. 1 is an example image of a partially constructed reinforced composite material in accordance with some embodiments of the present disclosure.

The following discussion is presented to enable a person skilled in the art to make and use embodiments of the invention. Given the benefit of this disclosure, various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled," and variations thereof, are used broadly and encompass both direct and indirect mountings, connections, supports, and couplings. Further, "connected" and "coupled" are not restricted to physical or mechanical connections or couplings.

The present disclosure provides a reinforced composite material comprising a composite material forming a geometric body, and a reinforcement member disposed in the composite material. In some embodiments, the reinforcement member comprises at least one elongate metal wire extending at least partially through the composite material, and at least one barb that extends from the elongate metal wire in a transverse direction to the elongate metal wire.

Figure 2:
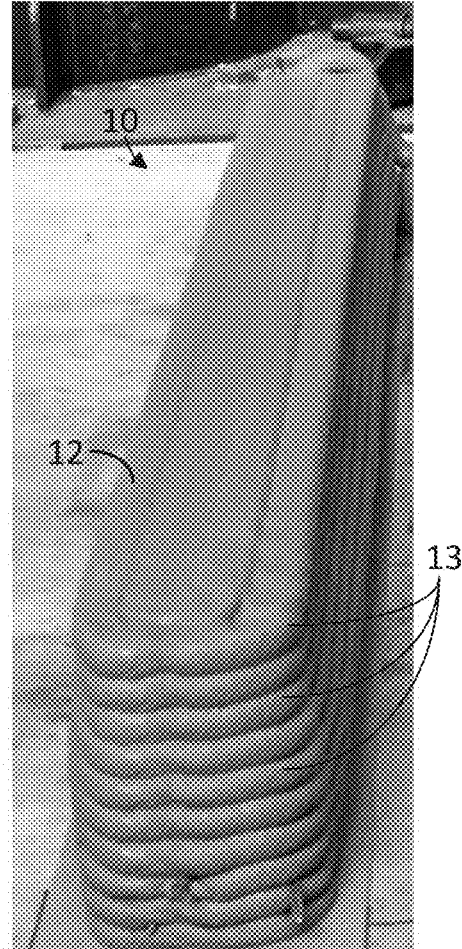
FIG. 2 is an example image of a fully constructed reinforced composite material in accordance with some embodiments of the present disclosure.
Figure 3:
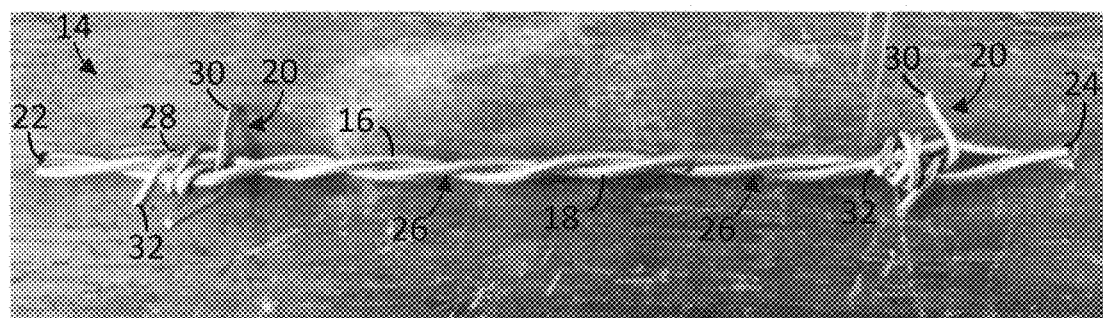
FIG. 3 is an example image of a reinforcement member in accordance with some embodiments of the present disclosure.

Referring to FIGS. 1-3, the present disclosure provides a reinforced composite material 10. In some embodiments, the composite material 12 forms a geometric body having a three-dimensional shape. As used herein, the term "geometric body" may refer to a three-dimensional shape or structure having a length, a width, and a height. The geometric body can be a regular shape, an irregular shape, and/or combinations thereof. The geometric body may be formed from a series of printed filaments 13 laid atop or next to one another. In some embodiments, the geometric body may form a structural member including, but not limited to, beams, slabs, columns, walls, bases, and/or foundations. The geometric body may be solid, hollow, and/or have a plurality of void spaces (e.g., channels) extending there through.

Composite Material:

As used herein, the term "composite material" may refer to a composition made out of two or more constituent compounds or chemical moieties. In some embodiments, the composite material 12 comprises a cementitious material. The cementitious material may be composed of cement, concrete, mortar, or combinations thereof.

In some embodiments, the cementitious material is cement. The cement may be (or may be formed from) the reaction product of a cement binder and water. As used herein, the term "cement" may refer to a mixture composed of the cement binder and water before the formation of the cement, during formation of the cement, and/or after formation of the cement. In some embodiments, the cement binder is a hydraulic cement binder or a non-hydraulic cement binder. Suitable cement binders include metal oxides that harden through hydration. Exemplary metal oxides include, but are not limited to, calcium oxides, silicon oxides (e.g., silica), aluminum oxides, iron oxides, magnesium oxides, sodium oxides, potassium oxides, sulfuric anhydrides, and combinations thereof. Non-limiting examples of hydraulic cement binders include Portland cement, Masonry cement, Mortar cement, and combinations thereof.

In some embodiments, the cement binder is present in an amount from 1 to 98 weight percent (wt %), based on total weight of the composition. In some embodiments, the cement binder is present from 40 wt % to 90 wt %, from 60 wt % to 85 wt %, each based on the total weight of the composition. In some embodiments, the water may be present in the cementitious material in an amount from 1 wt % to 60 wt %, from 5 wt % to 40 wt %, from 10 wt % to 20 wt %, based on the total weight of the composition. The water may be present prior to, during, and/or after the formation of the cementitious composition.

In some embodiments, the cement includes one or more additive. In some embodiments, the additive is present in an amount from 0.1 wt % to 20 wt %, based on total weight of the composition. Suitable additives include, but are not limited to, limestone, hydrated lime, fly ash, blast furnace slag, silica fume, water reducers, air entrainers, accelerators, retarders, and combinations thereof.

In some embodiments, the cementitious composition is concrete. The concrete may be (or may be formed from) the reaction product of a cement binder, aggregate, and water. As used herein, the term "concrete" may refer to a mixture composed of the cement binder, the aggregate, and the water before the formation of the concrete, during the formation of the concrete, and/or after the formation of the concrete.

In some embodiments, the cement binder is a hydraulic cement binder or a non-hydraulic cement binder. Suitable cement binders include metal oxides that harden through hydration. Exemplary metal oxides include, but are not limited to, calcium oxides, silicon oxides (e.g., silica), aluminum oxides, iron oxides, magnesium oxides, sodium oxides, potassium oxides, sulfuric anhydrides, and combinations thereof. Non-limiting examples of hydraulic cement binders include Portland cement, Masonry cement, Mortar cement, and combinations thereof. In some embodiments, the aggregate includes, but is not limited to, sand, gravel, and crushed stone. The aggregate may be fine aggregate (e.g., having a nominal diameter less than 5 mm) and/or course aggregate (e.g., having a nominal diameter greater than 5 mm).

In some embodiments, the cement binder is present in the concrete in an amount from 1 wt % to 40 wt % cement binder, based on total weight of the composition. In some embodiments, the cement binder is present in the concrete from 5 wt % to 30 wt %, from 10 wt % to 25 wt %, based on total weight of the composition. In some embodiments, the aggregate is present in an amount from 30 wt % to 85 wt %, from 60 wt % to 85 wt %, from 70 wt % to 80 wt %, based on total weight of the composition. In some embodiments, water is present in the concrete in an amount from 1 wt % to 40 wt %, from 5 wt % to 25 wt %, from 10 wt % to 20 wt %, based on total weight of the composition.

In some embodiments, the cementitious material is mortar. The mortar may be (or may be formed from) the reaction product of a cement binder, fine aggregate (e.g., a nominal diameter of less than 5 mm), and water. As used herein, the term "mortar" may refer to a mixture composed of the cement binder, fine aggregate, and water before the formation of the mortar, during formation of the mortar, and/or after formation of the mortar. In some embodiments, the cement binder is a hydraulic cement binder or a non-hydraulic cement binder. Suitable cement binders include metal oxides that harden through hydration. Exemplary metal oxides include, but are not limited to, calcium oxides, silicon oxides (e.g., silica), aluminum oxides, iron oxides, magnesium oxides, sodium oxides, potassium oxides, sulfuric anhydrides, and combinations thereof. Non-limiting examples of hydraulic cement binders include Portland cement, Masonry cement, Mortar cement, and combinations thereof.

In some embodiments, the cement binder is present in the mortar in an amount from 1 wt % to 40 wt % cement binder, based on total weight of the composition. In some embodiments, the cement binder is present in the mortar from 5 wt % to 30 wt %, from 10 wt % to 25 wt %, based on total weight of the composition. In some embodiments, the fine aggregate is present in the mortar in an amount from 30 wt % to 85 wt %, from 60 wt % to 85 wt %, from 70 wt % to 80 wt %, based on total weight of the composition. In some embodiments, water is present in the mortar in an amount from 1 wt % to 40 wt %, from 5 wt % to 25 wt %, from 10 wt % to 20 wt %, based on total weight of the composition.

In some embodiments, the present disclosure provides a printable cementitious composition that is particularly suitable for use in printing technologies and can be valuably employed to generate three-dimensional printed structures. The printed three-dimensional structures have surprising and beneficial attributes (e.g., structure and properties) to print structural forms, such as beams, slabs, columns, walls, bases, and foundations. The printable cementitious compositions may be used in a variety of applications, such as three-dimensional printing of above grade and foundation walls and slab-on-grade and footings for homes and other buildings, on-site/off-site printing of beams, columns, slabs, and walls, architectural and structural precast concrete/cementitious components (e.g., precast/prestressed girders of all cross-sectional shapes, cellular and solid precast/prestressed floor and roof panels, cladding panels, parapets, cornices, siding, roofing tiles), floor and low slope roof coverings (pavers), different infrastructure systems including bridge piers, cap beams, footings/piles, girders, decks, tunnel ceiling panel, and barriers/parapets, above grade liquid tanks, sumps, cisterns, manholes, pavement, curbs, and tunnel lining, which may be performed without the need of a mold to form the concrete structure.

Due to the relatively fast deposition rates of printing, conventional concrete compositions do not have enough time to gain strength and reach the structuration phase within the printing duration (e.g., a few minutes), and is prone to strength-based failure or collapse caused by low yield stress, low structuration rates, loss of stability, and/or buckling of the composition. For example, the normal way of making a three-dimensional concrete structure is to mix the ingredients in a concrete mixer and subsequently pouring the material into a mold or formwork. That is to say, traditional concrete compositions cannot be printed as filaments because the mixture is too fluid and does not have enough time to gain strength and reach the structuration phase before collapsing.

Unlike traditional concrete compositions, in some embodiments, the printable cementitious compositions provided herein are resistant to strength-based failure without using formwork and have a suitable yield stress and structuration rates such that the compositions may be printed, extruded, and/or deposited atop previous layers to build a three-dimensional object.

Extruded cementitious compositions are subject to tears or cracking when printed along paths with a curved radius and/or generally non-linear. In some embodiments, the printable cementitious compositions provided herein may be printed, extruded, and/or deposited to form a printed filament. FIGS. 1-2 illustrate the composite material 12 formed from a series of printed filaments 13 laid atop one another. For three-dimensional printing, no formwork or mold is required, and therefore, unlike traditional concrete that requires a certain slump characteristic to be able to flow in the formwork and around rebar, three-dimensional printed concrete provided herein does not follow the certain slump requirement. Rather, the printed filaments should be pumpable, flowable and buildable within open time (considering optimum setting time). This means that the mixture is pumpable through a hose and extrudable from a nozzle with a certain cross-sectional shape (e.g., any suitable geometry, such as circular, rectangular, etc.), and then once it is extruded and laid in the form of the printed filament, it should be soft enough to at least partially bond with adjacent filaments, and at the same time, it should be hard enough so that when the next layers are added on top of it, it can hold the weight.

In some embodiments, the printed filament is substantially or entirely free of tears or cracks. As used herein, a "tear" or "crack" may be defined as a void or absence of material along the outer portion of the printed three-dimensional structure. In some embodiments, the printable cementitious compositions have a smooth outer surface. In some embodiments, at least 70% of the total volume of the outer surface portion of the printed filament is free of tears or cracks, or at least 80%, or at least 85%, or at least 90%, or at least 95%, or at least 99%, or 99.9% of the total volume of the outer surface portion of the printed filament is free of tears or cracks when printed on a substrate or a previous layer. The cementitious composition may be free of tears or cracks for a duration. The duration may be for at least one day following deposition and/or printing, or at least two days, or at least three days, or at least four days, or at least 5 days, to less than one week, or at less than one month, or less than six months, or less than one year, or less than two years, or less than three years.

In some embodiments, the printable composition provided herein comprises a cement binder, an aggregate, at least one pozzolanic additive, an accelerator, water, and a nanoclay.

In some embodiments, the cement binder is a hydraulic cement binder or a non-hydraulic cement binder. Suitable cement binders include metal oxides that harden through hydration. Exemplary metal oxides include, but are not limited to, calcium oxides, silicon oxides (e.g., silica), aluminum oxides, iron oxides, magnesium oxides, sodium oxides, potassium oxides, sulfuric anhydrides, and combinations thereof. Non-limiting examples of hydraulic cement binders include Portland cement, Masonry cement, Mortar cement, and combinations thereof.

In some embodiments, the printable cementitious composition contains the cement binder in an amount from 15 wt % to 45 wt %, based on the total weight of the cementitious composition. In some embodiments, the printable cementitious composition contains at least 15 wt % of the cement binder, or at least 16 wt %, or at least 17 wt %, or at least 18 wt %, or at least 19 wt %, or at least 20 wt %, or at least 21 wt %, or at least 22 wt %, or at least 23 wt %, or at least 24 wt %, or at least 25 wt %, or at least 26 wt %, or at least 27 wt %, or at least 28 wt %, or at least 29 wt %, to less than 30 wt %, or less than 31 wt % or less than 32 wt %, or less than 33 wt %, or less than 34 wt %, or less than 35 wt %, or less than 36 wt %, or less than 37 wt %, or less than 38 wt %, or less than 39 wt %, or less than 40 wt %, or less than 41 wt %, or less than 42 wt %, or less than 43 wt %, or less than 44 wt %, or less than 45 wt %, based on total weight of the printable cementitious composition.

In some embodiments, the aggregate is composed of gravel, sand, recycled concrete, basalt, and/or combinations thereof.

In some embodiments, the aggregate comprises one or more material selected from aluminum oxide (from 14 to 35 wt %, based on the total weight of the aggregate), calcium oxide (from 5 to 25 wt %, based on the total weight of the aggregate), iron oxide (from 5 to 15 wt %, based on the total weight of the aggregate), magnesium oxide (from 5 to 15 wt %, based on the total weight of the aggregate), silica (less than 1 wt %, based on the total weight of the aggregate), calcium sulfate (from 0 to 6 wt %, based on the total weight of the aggregate), and ferro-actinolite (from 0 to 6 wt %, based on the total weight of the aggregate). Non-limiting examples of aggregate suitable for use in the printable cementitious composition include Har Tru Basalt provided by Har-Tru.

In some embodiments, the aggregate comprises one or more material selected from silicates and oxides of calcium, sodium, aluminum, silicon, iron, magnesium, and tin. In some embodiments, the aggregate includes one or more naturally occurring materials such as calcium-sodium alumino silicates (e.g., plagioclase feldspar), calcium iron magnesium alumino silicates (e.g., pyroxene), iron titanium oxide (titanomagnetite), and silica (e.g., quartz). Non-limiting examples of aggregates suitable for use in the printable cementitious composition include Tilcon Basalt provided by Tilcon New York Inc.

In some embodiments, the aggregate is composed of particles having a particle size from 0.01 mm to 5 mm. In some embodiments, the aggregate is composed of particles having a particle size of at least 0.01 mm, or at least 0.1 mm, or at least 0.2 mm, or at least 0.3 mm, or at least 0.4 mm, or at least 0.5 mm, or at least 0.6 mm, or at least 0.7 mm, to less than 0.8 mm, or less than 0.9 mm, or less than 1 mm, or less than 1.1 mm, or less than 1.2 mm, or less than 1.3 mm, or less than 1.4 mm, or less than 1.5 mm, or less than 1.6 mm, or less than 1.7 mm, or less than 1.8 mm, or less than 1.9 mm, or less than 2.0 mm, or less than 3.0 mm, or less than 4.0 mm, or less than 5.0 mm. Both passed sieve #16 suggesting the size of grains in the composition are smaller than 1.18 mm.

In some embodiments, the printable cementitious composition contains from 35 wt % to 60 wt % aggregate, based on the total weight of the printable cementitious composition. In some embodiments, the printable cementitious composition contains at least 35 wt % aggregate, or at least 36 wt %, or at least 37 wt %, or at least 38 wt %, or at least 39 wt %, or at least 40 wt %, or at least 41 wt %, or at least 42 wt %, or at least 43 wt %, or at least 44 wt %, to less than 45 wt %, or less than 46 wt %, or less than 47 wt %, or less than 48 wt %, or less than 49 wt %, or less than 50 wt %, or less than 51 wt %, or less than 52 wt %, or less than 53 wt %, or less than 54 wt %, or less than 55 wt %, or less than 56 wt %, or less than 57 wt %, or less than 58 wt %, or less than 59 wt %, or less than 60 wt %, based on total weight of the printable cementitious composition.

In some embodiments, the printable cementitious composition comprises at least one pozzolanic additive. Suitable pozzolanic additives include, but are not limited to, silica fume, slag, metakaolin, fly ash, limestone, and calcined clay. In some embodiments, the printable cementitious composition contains from 1 wt % to 25 wt % pozzolanic additive(s), based on the total weight of the printable cementitious composition. In some embodiments, the printable cementitious composition contains at least 1 wt % pozzolanic additive(s), or at least 2 wt %, or at least 3 wt %, or at least 4 wt %, or at least 5 wt %, or at least 6 wt %, or at least 7 wt %, or at least 8 wt %, or at least 9 wt %, or at least 10 wt %, or at least 11 wt %, or at least 12 wt %, to less than 13 wt %, or less than 14 wt %, or less than 15 wt %, or less than 16 wt %, or less than 17 wt %, or less than 18 wt %, or less than 19 wt %, or less than 20 wt %, or less than 25 wt %, based on the total weight of the printable cementitious composition.

In some embodiments, the at least one pozzolanic additive includes silica fume. In some embodiments, the printable cementitious composition contains from 0.5 wt % to 5 wt % silica fume, based on total weight of the printable cementitious composition. In some embodiments, the printable cementitious composition contains at least 0.5 wt % silica fume, or at least 1 wt %, or at least 1.5 wt %, or at least 2 wt %, to less than 2.5 wt %, or less than 3 wt %, or less than 3.5 wt %, or less than 4 wt %, or less than 4.5 wt %, or less than 5 wt %, based on the total weight of the printable cementitious composition.

In some embodiments, the at least one pozzolanic additive includes slag. In some embodiments, the printable cementitious composition contains from 1 wt % to 20 wt % slag, based on total weight of the printable cementitious composition. In some embodiments, the printable cementitious composition contains at least 1 wt % slag, or at least 2 wt %, or at least 3 wt %, or at least 4 wt %, or at least 5 wt %, or at least 6 wt %, or at least 7 wt %, or at least 8 wt %, or to less than 9 wt %, or less than 10 wt %, or less than 15 wt %, or less than 20 wt % slag, based on the total weight of the printable cementitious composition.

In some embodiments, the at least one pozzolanic additive includes metakaolin. In some embodiments, the printable cementitious composition contains from 0.5 wt % to 10 wt % metakaolin, based on total weight of the printable cementitious composition. In some embodiments, the printable cementitious composition contains at least 0.5 wt % metakaolin, or at least 1 wt %, or at least 1.5 wt %, or at least 2 wt %, or at least 2.5 wt %, or at least 3 wt %, to less than 3.5 wt %, or less than 4 wt %, or less than 4.5 wt %, or less than 5 wt %, or less than 6 wt %, or less than 7 wt %, or less than 8 wt %, or less than 9 wt %, or less than 10 wt % based, on the total weight of the printable cementitious composition.

In some embodiments, the printable cementitious composition comprises an accelerator. As used herein, the term "accelerator" may refer to compounds or chemical moieties that increase the setting time of the cementitious composition. In some embodiments, the accelerator includes water soluble calcium compounds and/or water soluble silicate compounds.

Exemplary water soluble calcium compounds include, but are not limited to, calcium chloride, calcium nitrate, calcium formate, calcium acetate, calcium bicarbonate, calcium bromide, calcium carbonate, calcium citrate, calcium chlorate, calcium fluoride, calcium gluconate, calcium hydroxide, calcium hypochloride, calcium iodate, calcium iodide, calcium lactate, calcium nitrite, calcium oxalate, calcium phosphate, calcium propionate, calcium silicate, calcium stearate, calcium sulphate, calcium sulphate hemihydrate, calcium sulphate dihydrate, calcium sulphide, calcium tartrate calcium aluminate, tricalcium silicate and/or dicalcium silicate.

In some embodiments, calcium citrate, calcium tartrate, calcium formate, calcium acetate, calcium nitrate, and/or calcium sulphate may offer particular advantages due to their non-corrosive properties.

Exemplary water soluble silicate compounds include sodium silicate, potassium silicate, waterglass, aluminium silicate, tricalcium silicate, dicalcium silicate, calcium silicate, silicic acid, sodium metasilicate and/or potassium metasilicate. Sodium silicate, potassium silicate, and/or waterglass are particularly advantageous due to high water solubility. Further, sodium silicate and/or sodium metasilicate are substantially cheaper reagents compared to calcium chloride, which is also corrosive.

In some embodiments, the printable cementitious composition contains from 0.1 wt % to 5 wt % accelerator, based on the total weight of the printable cementitious composition. In some embodiments, the printable cementitious composition contains at least 0.1 wt % accelerator, or at least 0.2 wt %, or at least 0.3 wt %, or at least 0.4 wt %, or at least 0.5 wt %, or at least 0.6 wt %, or at least 0.7 wt %, or at least 0.8 wt %, or at least 0.9 wt %, or at least 1 wt %, to less than 1.5 wt %, less than 2 wt %, less than 3 wt %, less than 4 wt %, or less than 5 wt %, based on the total weight of the cementitious composition.

In some embodiments, the printable cementitious composition comprises a water-reducing agent. As used herein, the term "water-reducing agent" may refer to a compound that improves the flow characteristics in the cementitious composition and/or allows for the production of a cementitious composition having reduced water content. Exemplary water-reducing agents include, but are not limited to, ligno-sulphonates, lignosulphonate salts, sulfonated naphthalene formaldehyde condensate, sulfonated melamine formaldehyde condensate, acetone formaldehyde condensate, polycarboxylate ethers, crosslinked melamine or naphthalene sulfonates (e.g., polymelamine sulfonate and polynapthalene sulfonate), and combinations thereof. Non-limiting examples include Sika® ViscoCrete® 225 (P-225).

In some embodiments, the printable cementitious composition contains from 0.01 wt % to 2 wt % water-reducing agent, based on the total weight of the printable cementitious composition. In some embodiments, the printable cementitious composition contains at least 0.01 wt %, or at least 0.05 wt %, or at least 0.1 wt %, or at least 0.15 wt %, or at least 0.2 wt %, to less than 0.5 wt %, or less than 1 wt %, or less than 2 wt %, based on the total weight of the printable cementitious composition.

In some embodiments, the printable cementitious composition comprises water. In some embodiments, the printable cementitious composition contains from 5 wt % to 20 wt % water, based on total weight of the printable cementitious composition. In some embodiments, the printable cementitious composition contains at least 5 wt % water, or at least 6 wt %, or at least 7 wt %, or at least 8 wt %, or at least 9 wt %, or at least 10 wt %, or at least 11 wt %, or at least 12 wt %, or at least 13 wt %, to less than 14 wt %, or less than 15 wt %, or less than 16 wt %, or less than 17 wt %, or less than 18 wt %, or less than 19 wt %, or less than 20 wt %, based on total weight of the printable cementitious composition.

In some embodiments, the printable cementitious composition comprises nanoclay. Exemplary nanoclays include, but are not limited to, montmorillonite, bentonite, kaolinite, hectorite, halloysite, and combinations thereof. In some embodiments, the nanoclay is composed of mineral silicates. In some embodiments, the nanoclay has a particle size or physical dimension from 1 nm to 5 μm, from 1 nm to 1 μm, from 1 nm to 500 nm, or from 1 nm to 150 nm.

In some embodiments, the printable cementitious composition contains from 0.01 wt % to 5 wt % nanoclay, based on the total weight of the printable cementitious composition. In some embodiments, the printable cementitious composition contains at least 0.01 wt %, or at least 0.05 wt %, or at least 0.1 wt %, or at least 0.15 wt %, or at least 0.2 wt %, or at least 0.3 wt %, or at least 0.4 wt %, or at least 0.5 wt %, to less than 1 wt %, or less than 2 wt %, or less than 3 wt %, or less than 4 wt %, or less than 5 wt %, based on the total weight of the printable cementitious composition.

In some embodiments, the printable cementitious composition has a water to cement binder ratio (w/c) from 30% to 50%. In some embodiments, the w/c is at least 30%, or at least 35%, or at least 40%, to less than 45%, or less than 50%.

In some embodiments, the printable cementitious composition has a flow table test (cm) from 15 cm to 20 cm. In some embodiments, the printable cementitious composition has a flow table test (cm) of at least 15 cm, or at least 16 cm, to less than 17 cm, or less than 18 cm, or less than 19 cm, or less than 20 cm. The flow table test may be measured in accordance with ASTM C230.

In some embodiments, the printable cementitious composition has an initial set time from 50 minutes to 180 minutes. In some embodiments, the printable cementitious composition has an initial set time of at least 50 minutes, or at least 60 minutes, or at least 70 minutes, or at least 80 minutes, or at least 90 minutes, or at least 100 minutes, to less than 110 minutes, or less than 120 minutes, or less than 130 minutes, or less than 140 minutes, or less than 150 minutes, or less than 160 minutes, or less than 170 minutes, or less than 180 minutes. The initial set time may be measured in accordance with ASTM C191.

In some embodiments, the printable cementitious composition has a final set time from 80 minutes to 300 minutes. In some embodiments, the printable cementitious composition has a final set time of at least 80 minutes, or at least 90 minutes, or at least 100 minutes, or at least 120 minutes, or at least 140 minutes, or at least 160 minutes, or at least 180 minutes, or at least 200 minutes, to less than 220 minutes, or less than 240 minutes, or less than 260 minutes, or less than 280 minutes, or less than 300 minutes. The final set time may be measured in accordance with ASTM C191.

In some embodiments, the printable cementitious composition has a fresh density from 2.0 to 2.4 g/cm³. In some embodiments, the printable cementitious composition has a fresh density of at least 2.0 g/cm³, or at least 2.05 g/cm³, or at least 2.1 g/cm³, to less than 2.15 g/cm³, or less than 2.2 g/cm³, or less than 2.25 g/cm³, or less than 2.3 g/cm³.

In some embodiments, the printable cementitious composition has a 2-day strength from 10 MPa to 55 MPa. In some embodiments, the printable cementitious composition has a 2-day strength test of at least 10 MPa, or at least 15 MPa, or at least 20 MPa, or at least 25 MPa, or at least 30 MPa, or at least 35 MPa, to less than 40 MPa, or less than 45 MPa, or less than 50 MPa, or less than 55 MPa. The 2-day strength may be measured in accordance with ASTM C39.

In some embodiments, the printable cementitious composition has a 28-day strength from 25 MPa to 85 MPa. In some embodiments, the printable cementitious composition has a 28-day strength of at least 25 MPa, or at least 30 MPa, or at least 35 MPa, or at least 40 MPa, or at least 45 MPa, to less than 50 MPa, or less than 60 MPa, or less than 65 MPa, or less than 70 MPa, or less than 75 MPa, or less than 80 MPa, or less than 85 MPa.

Reinforcement Member:

The present reinforced composite material 10 includes a reinforcement member 14 disposed in the composite material 12. The reinforcement member 14 comprises at least one elongate metal wire 16 extending at least partially through the composite material 12, and at least one barb 20 that extends from the elongate metal wire 16 in a transverse direction. As used herein, the term "barb" refers to a projection that extends from the elongate metal wire 16 at an angle. In some embodiments, the angle is slanted or perpendicular to the elongate metal wire 16. In one embodiment, the barb 20 extends transverse to a local segment of the elongate metal wire 16 at the location at which the barb 20 extends. The barb 20 may be a separate component from the elongate member or may be integrally formed with the elongate metal wire 16. The barbs 20 may be sharp, blunt, and/or combinations thereof.

The elongate metal wire 16 extends from a first end 22 to a second end 24. It is understood that the length of the elongate metal wire 16 is not limited. The elongate metal wire 16 may extend the entire length of the composite material 12. The elongate metal wire 16 may extend along a portion of the composite material 12. In some embodiments, the elongate metal wire 16 extends from 5% to 100% of the length of the composite material. In some embodiments, the elongate metal wire 16 extends from 5%, or 10%, or 20%, or 30%, or 40%, or 50%, or 60%, or 70%, or 80%, or 90%, or 95%, or 99.9%, or 100% of the length of the composite material.

In some embodiments, the reinforcement member 14 includes a single elongate metal wire 16. In some embodiments, the reinforcement member 14 includes two elongate metal wires 16, 18 that are helically twisted along the length of the wires 16, 18. In some embodiments, the reinforcement member 14 includes from 2 to 10 elongate metal wires that are helically twisted along the length of the wires. In some embodiments, the reinforcement member includes at least 2 elongate wires, or 3, or 4, or 5, or 6, or 7, to 8, or 9, or 10 elongate metal wires that are helically twisted.

In some embodiments, the degree of twisting between the elongate wires 16, 18 is characterized by the number of nodes 26 between barbs 20. As used herein, the term "node" may be a point along the twisted wire strand where there is a minimum amplitude of the twisted wires when viewed from a cross section. In some embodiments, the reinforcement member 14 includes from 1 to 20 nodes between the barbs 20. In some embodiments, the reinforcement member 14 includes at least 1 node, or 2, or 3, or 4, or 6, or 7, or 8, or 9, or at least 10 nodes between the barbs 20. In some embodiments, the reinforcement member 14 includes less than 12 nodes, or less than 14 nodes, or less than 16 nodes, or less than 18 nodes, or less than 20 nodes between the barbs 20.

In some embodiments, the reinforcement member 14 is composed of one or more elongate wire 16, 18 having a diameter from 1 mm to 20 mm. In some embodiments, the reinforcement member 14 has a diameter of at least 1 mm, or at least 1.5 mm, or at least 2 mm, or at least 3 mm, or at least 4 mm, or at least 5 mm. In some embodiments, the reinforcement member 14 is composed of one or more elongate wire 16, 18 having a diameter of less than 6 mm, less than 7 mm, less than 8 mm, less than 9 mm, less than 10 mm, less than 15 mm, or less than 20 mm.

In some embodiments, the barb 20 is composed of one or more transverse metal wire 28 extending from a first end 30 to a second end 32. The transverse metal wire 28 may be wrapped around or between the one or more elongate metal wire 16, 18 such that at least one of the ends 30, 32 projects from the elongate metal wire 16 in a transverse direction. In some embodiments, the barb 20 is a two-point barb composed of a single barb wire twisted on the one or more elongate wire 16, 18. In some embodiments, the barb 20 is a four-point barb composed of two barb wires twisted on the one or more elongate wire 16, 18. In some embodiments, the one or more barb 20 is twisted between two or more elongate wires 16, 18. In some embodiments, the one or more barb 20 is twisted outside of the two or more elongate wires 16, 18. The ends 30, 32 of the barbs 20 may be sharp, blunt, and/or combinations thereof.

In further embodiments, the barbs 20 are sized such that at least a portion of the barb 20 (e.g., ends 30, 32) is configured to intersect or bridge more than one adjacent filament and/or layer (e.g., as discussed below in connection with the various examples). An example is illustrated in FIGS. 1 and 2 that depicts positioning of the reinforcement member 14 at, for instance, the abutment (e.g., generally laterally) between four adjacent extruded/printed filaments and extending between stacked (e.g., generally vertically) layers, with three layers depicted in FIG. 1 and ten layers depicted in FIG. 2. In this configuration, a barb 20 that is in engagement and/or contact with more than one filament and/or layer may function to enhance the integration and/or bond of the overall reinforced composite material 10 (e.g., inhibit separation of the composite material 12 and the reinforcement member 14). In some embodiments, the placement and locating of the reinforcement members 14 within the composite material 12 (e.g., relative to the filaments and layers) can be, for example, automated, manual, and/or some combination thereof. In further embodiments, the particular number and arrangement of filaments and layers is altered to adapt to application specific requirements, such as the constraints of the manufacturing process and/or of the ultimate application of the reinforced composite material 10.

Certain challenges arise when using a printable cementitious composition to form the reinforced composite material 10. For example, printing filaments side by side or layer over layer must bond together (vertically or horizontally) such that the layers below are able to carry the weight of the layers above without collapsing. Cementitious compositions may be optimized with respect to setting time so that the filaments are soft enough to bond to adjacent layers, yet hard enough to carry the weight of gravity. This also applies to placement of the reinforcement member 14 over filaments, meaning there must be adequate bond with the cementitious material. In some embodiments, the number of reinforcement members 14 depends on the expected loads on the printed object. For example, the larger the load on a beam at a given span, either the depth of the beam must become larger or the amount of reinforcement must increase. In general, placing the reinforcement member 15 in lower layers (e.g., bottom half of the reinforced composite material 10) provides a larger moment arm distance from a neutral axis to more effectively resist the applied loads. For this reason, the reinforcing member 14 may be placed over a sufficient distance within a layer, at with a sufficient horizontal spacing, and at enough layers to have enough capacity to carry the applied loads.

In some embodiments, some or all of the barbs 20 have a barb spacing along the length of the one or more elongate wire 16, 18 from 1 cm to 50 cm, from 5 cm to 35 cm, or from 10 to 25 cm. In some embodiments, the barbs 20 have a barb spacing of at least 1 cm, or at least 2 cm, or at least 3 cm, or at least 4 cm, or at least 5 cm, or at least 6 cm, or at least 7 cm, or at least 8 cm, or at least 9 cm, or at least 10 cm, or at least 11 cm, or at least 13 cm, or at least 14 cm, or at least 15 cm. In some embodiments, the barbs 20 have a barb spacing of less than 20 cm, or less than 30 cm, or less than 40 cm, or less than 50 cm.

In some embodiments, the composite material 12 is in direct contact with the reinforcement member 14. In some embodiments, the composite material 12 completely surrounds the one or more elongate metal wire 16, 18 and/or the one or more barbs 20. In some embodiments, the elongate wire 16, 18 and/or the barbs 20 are composed of steel. In some embodiments, the elongate metal wire 16 and/or the barbs 20 are galvanized. In some embodiments, the elongate metal wire 16 and barbs 20 comprise a coating, such as PVC.

In some embodiments, the reinforcement member 14 is positioned between the plurality of printed filaments in the composite material 12. For example, the reinforcement member 14 may be disposed between a first printed filament and a second printed filament in the composite material 12, where at least a portion of the barbs 20 extend from the elongate wire 16, 18 to project into the first printed filament, and at least a portion of the barbs 20 project into the second printed filament. In this way, the reinforcement member 14 provides a lateral bond between overlaying filaments.

In some embodiments, the reinforcement member 14 extends through the composite material 12 in a pattern. Non-limiting examples of suitable patterns include a parallel pattern, an arcuate pattern, a grid pattern, or a random pattern.

In some embodiments, the reinforcement member 14 extends through the composite material 12 in a parallel pattern. The term "parallel," as used herein, may refer to reinforcement members 14 extending in the same direction along the length of the composite material 12. In some embodiments, the reinforcement members 14 do not intersect along the length of the composite material 12.

In some embodiments, the reinforcement member 14 extends through the composite material 12 in an arcuate pattern. The term "arcuate," as used herein, may refer to reinforcement members 14 extending through the composite material 12 with a curved or bowed configuration. In some embodiments, the composite material 12 has a curved surface and the reinforcement member 14 comprises an arcuate pattern that substantially matches or exactly matches the curved surface of the composite material 12.

In some embodiments, the reinforcement member 14 forms a grid pattern in the composite material 12. The term "grid," as used herein, may refer to a framework of spaced reinforcement members 14 that cross each other in axial and longitudinal directions to form a three-dimensional grating that may be formed with squares or rectangles.

In some embodiments, the reinforcement member 14 forms a random pattern in the composite material 12. The term "random pattern," as used herein, may refer to an entangled web or matrix of reinforcement members 14 disposed within the composite material 12.

In some embodiments, the reinforced composite material 10 is arranged in rows and/or columns within the composite material 12. In some embodiments, the composite material 12 includes from 1 to 500, from 2 to 50, or from 5 to 10 rows and/or columns of reinforcement members 14. In some embodiments, the composite material 12 includes at least 1 row and/or column of reinforcement members 14, or at least 2, or at least 3, or at least 4, or at least 5, or at least 6, or at least 7, or at least 8, or at least 9, or at least 10, or at least 15, or at least 20, or at least 30, or at least 40, or at least 50, or at least 60, or at least 70, or at least 80, or at least 90, or at least 100 rows and/or columns of reinforcement members 14. In some embodiments, the composite material 12 includes less than 100 rows and/or columns of reinforcement members 14, or less than 200, or less than 300, or less than 400, or less than 500 rows and/or columns of reinforcement members 14.

In some embodiments, each of the individual rows and/or columns may be composed of a single reinforcement member 14. In some embodiments, each of the individual rows and/or columns may be composited of multiple, discontinuous reinforcement members spaced apart along the row and/or column. In some embodiments, each of the individual rows and/or columns includes from 1 to 500 reinforcement members 14.

In some embodiments, the reinforced composite material 10 has a modulus of rupture (e.g., tensile strength of the beam at its failure point under a load) from 1 MPa to 30 MPa. In some embodiments, the reinforced composite material 10 has a modulus of rupture from at least 1 MPa, or at least 2 MPa, or at least 3 MPa, or at least 4 MPa, or at least 5 MPa, or at least 6 MPa, to less than 7 MPa, or less than 8 MPa, or less than 9 MPa, or less than 10 MPa, or less than 11 MPa, or less than 12 MPa, or less than 13 MPa, or less than 14 MPa, or less than 15 MPa, or less than 20 MPa, or less than 25 MPa, or less than 30 MPa.

In some embodiments, the reinforced composite material 10 has a tensile bond strength between the reinforcement member 14 and the composite material 12 from 500 MPa to 1,500 MPa. In some embodiments, the reinforced composite material 10 has a tensile bond strength between the reinforcement member 14 and the composite material 12 from at least 500 MPa, or at least 600 MPa, or at least 700 MPa, or at least 800 MPa, or at least 900 MPa, or at least 1000 MPa, to less than 1100 MPa, or less than 1200 MPa, or less than 1300 MPa, or less than 1400 MPa, or less than 1500 MPa.

Figure 11:
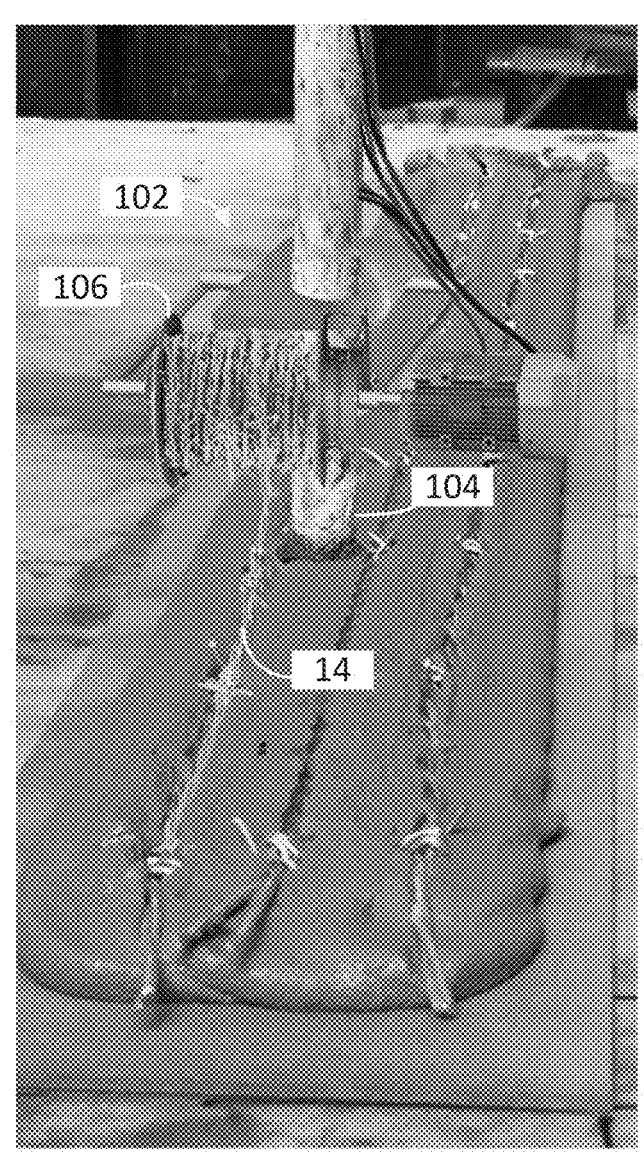
FIG. 11 is an image of an example three-dimensional printing system in accordance with some embodiments of the present disclosure.

Three-Dimensional Printing System:

In some embodiments, the present disclosure provides a three-dimensional printing system. Referring to FIG. 11, a three-dimensional printing system 100 is illustrated in accordance with some embodiments of the present disclosure. The three-dimensional printing system 100 includes a print head 102 having a nozzle 104 for depositing the composite material 12 on a printing surface. The print head 102 may be connected to a multi-motor stepper configured to move the print head in three dimensions. The three-dimensional printing system 100 includes a spool 106 comprising the reinforcement member 14 wound around the spool 106. The spool 106 may be connected to the print head 102.

In some embodiments, the spool 106 is configured to deposit the reinforcement member 14 onto the composite material 12. The spool 106 may be configured to deposit the reinforcement member 14 ahead or behind of the nozzle 104 that deposits the composite material 12. In this way, the reinforcement member 14 may be deposited between adjacent layers of printed filaments of the composite material 12. Although not illustrated in FIG. 11, the print head 102 may include a plurality of nozzles configured to dispense the composite material 12, and a plurality of spools for depositing multiple reinforcement members 14.

In some embodiments, the three-dimensional printing system 100 includes a controller (not shown) that is programmed to regulate the flow of the composite material 12 through the print head 102 (e.g., by opening a valve within the print head). The controller may also be programmed to regulate the rate of deposition of the reinforcement member 14 to the printing surface (e.g., by controlling the rotation rate of the spool 106).

Methods:

In some embodiments, the present disclosure provides a method of forming the reinforced composite material 10. The method includes depositing a first filament of a composite material 12 (e.g., cementitious material) on a printing surface from a nozzle 104 of a print head 102. The method further includes contacting the reinforcement member 14 to a surface of the first filament, and depositing at least one additional filament of the composite material 12 atop the first filament, thereby forming a three-dimensional structure. In some embodiments, the reinforcement member 14 is contacted with the first filament while concurrently depositing the at least one additional filament of the composite material 12 atop the first filament, e.g., FIG. 11. Alternatively, the reinforcement member 14 may be first contacted on a surface of the first filament of the composite material 12 followed by depositing at least one additional filament of the composite material 12 over the reinforcement member 14 and the first filament of the composite material 12.

In some embodiments, the flow of composite material 12 is continuous so that a non-interrupted printing of the composite material 12 forms along a path defined by movement of the print head 102. In some embodiments, the three-dimensional structure may be printed through continuous deposition of the composite material 12. For example, an initial printing pattern or path of movement may be repeated until multiple filament layers at deposited atop one another to form the three-dimensional structure. Additionally or alternatively, the printing of the composite material 12 may be non-continuous, e.g., the first filament may be printed, followed by contacting the reinforcement member to a surface of the first filament, followed by printing of the at least one additional filament.

EXAMPLES

The following examples are presented by way of illustration and are not meant to be limiting in any way.

Example 1: Flexural Strength Test

Three-dimensional printed beams were produced and reinforced using barbed wires, steel rebars, and fiber reinforced polymer (FRP) rebars. Each beam had a 1200 mm length, 100 mm width, and a 150 mm depth. Each beam consisted of 4 beads in each horizontal layer and 10 layers in the full depth.

The configuration of the reinforcement members are illustrated in FIG. 4. At least three flexural strength measurements were taken to establish a mean and standard deviation. Printing parameters for the concrete were as follows: a pumping rate of 3.16 lit/min, a nozzle size of 1 inch (25.4 mm), a water flow rate of 800 kg/hour, a robot speed of 171 mm/sec (57% of 300 mm/sec), and a nozzle distance to bed of 15 mm.

The three-dimensional printed beams were produced by leveling the printing area by using steel beams overlain with OSB/particle board sheets to make platforms. A particle board sheet (200×1300 mm) was then placed on the platform to print a beam over it. 75 barbed wires (1250 mm long) were cut and straightened (e.g., barbed wires were twisted by using a drill on one end and fixing the other end in a vise; in order to be consistent, the number of nodes between every two adjacent barbs in the twisted wire was chosen to be 6).

A G-code was developed to simulate a 3D printed block by first importing the 3D geometry into the slicer Cura, which first exports the G-code and then converts it into Rapid code used by the robot in Robot Studio (G-Code, Robot Studio). A lubricant (e.g., WD-40) was sprayed on the board surface so that printed beam can separate from the board after curing. The first layer was printed, then for the reinforcement placement, the auto robot-mode was canceled, and the robot moved the nozzle to the bucket so the flow of printed filament continues. The barbed wires were placed manually, and then the printing process resumed right after reinforcement placement. The printed beams were cured by spraying water and covering the specimen with polyethylene plastic shroud for the first 24 hours. The flexural strength of the beams was measured and compared after seven days of 3D printing the beams. Load-deflection data was collected under a three-point loading set-up testing, as illustrated in FIG. 5. The printing temperature was 26° C., the humidity was controlled to 71%, and the material was Gulf Concrete Technology concrete (GCT).

Before running the tests, the depth and width of each beam were measured at three different points (close to the supports and at the mid-length of the beam). Maximum bending load, deformation, and module of rupture (MOR) are displayed in Table 1. Three different failure patterns were observed for these beams. S11 beams with no reinforcement experienced a brittle and acute flexural failure, which is characterized by crushing of concrete at mid length of the beam because of lack of any reinforcement. This failure occurred without any warning, e.g., did not develop any cracks prior to failure, which is expected in unreinforced concrete beams.

For S12 beams with two rows of two wire reinforcement (FIG. 4), the flexural failure was governed by concrete crushing after yielding of the barbed wires. Adding some reinforcement, as expected, reduces the brittleness. After crushing of concrete, application of small additional load caused full failure of beam at mid-span, where the wires pulled-out. The test results showed that the amount of reinforcement was not sufficient to hold the broken parts of the concrete beam together, and the beam split into two separate parts.

S13 and S14 beams had the same number of wires (6) but distributed differently in the cross section of the beam: S13 had three rows of two wires, whereas S14 had two rows of three wires, as shown in FIG. 4. These beams experienced mainly flexural failure. Vertical flexural cracks in the concrete started to form firstly in the tensile zone (bottom of the beam) at about mid-span followed by propagation of inclined flexural-shear cracks, leading to collapse.

Specimens S15 with three rows of three wire reinforcement (FIG. 4) also experienced a flexural-shear failure. The 6-wire reinforcement configuration allowed these beams to carry larger loads compared to S13 and S14 specimens and resulted in the largest flexural resistance (f=Mc/I) or Modules of Rupture (MOR) of 11.65 MPa. Table 1 lists the details of all specimen dimensions, area of wire reinforcement, maximum load at failure (P), maximum deflection, and maximum flexural stress (f=Mc/I), where M is the flexural moment at failure (M=PL/4).

TABLE 1

Results of flexural test

| Beam # | | Width (mm) (3) | Ave. | Depth (mm) (3) | Ave. | Length (mm) (between supports) | As (mm$^2$) | Max Load (KN) | Max Deformation mm | Maximum Flexural Stress or MOR (MPa) | |
|---|---|---|---|---|---|---|---|---|---|---|---|
| S11 | 1 | 105 | 107 | 150 | 151 | 1000 | 0.00 | 3.68 | 0.03 | 2.27 | 2.56 |
| | | 106 | | 151 | | | | | | | |
| | | 111 | | 150 | | | | | | | |
| | 2 | 107 | 106 | 148 | 149 | 1000 | | 4.24 | 0.53 | 2.70 | |
| | | 105 | | 149 | | | | | | | |
| | | 107 | | 150 | | | | | | | |
| | 3 | 107 | 108 | 150 | 151 | 1000 | | 4.42 | 0.58 | 2.71 | |
| | | 107 | | 151 | | | | | | | |
| | | 109 | | 151 | | | | | | | |
| S12 | 1 | 108 | 108 | 148 | 148 | 1000 | 23.56 | 11.07 | 7.06 | 7.09 | 6.48 |
| | | 107 | | 147 | | | | | | | |
| | | 107 | | 148 | | | | | | | |
| | 2 | 109 | 108 | 148 | 148 | 1000 | | 10.42 | 5.18 | 6.58 | |
| | | 108 | | 148 | | | | | | | |
| | | 108 | | 147 | | | | | | | |
| | 3 | 110 | 110 | 149 | 148 | 1000 | | 9.22 | 3.51 | 5.77 | |
| | | 109 | | 147 | | | | | | | |
| | | 110 | | 148 | | | | | | | |
| S13 | 1 | 114 | 114 | 146 | 147 | 1000 | 35.34 | 13.75 | 5.94 | 8.41 | 8.45 |
| | | 112 | | 147 | | | | | | | |
| | | 115 | | 147 | | | | | | | |
| | 2 | 106 | 106 | 148 | 149 | 1000 | | 13.30 | 5.54 | 8.52 | |
| | | 106 | | 149 | | | | | | | |
| | | 106 | | 149 | | | | | | | |
| | 3 | 113 | 113 | 149 | 151 | 1000 | | 14.36 | 5.38 | 8.41 | |
| | | 112 | | 151 | | | | | | | |
| | | 114 | | 152 | | | | | | | |
| S14 | 1 | 109 | 109 | 145 | 145 | 1000 | 35.34 | 13.35 | 4.67 | 8.74 | 8.98 |
| | | 108 | | 146 | | | | | | | |
| | | 108 | | 145 | | | | | | | |
| | 2 | 110 | 110 | 150 | 148 | 1000 | | 14.35 | 4.27 | 8.88 | |
| | | 110 | | 147 | | | | | | | |
| | | 110 | | 148 | | | | | | | |
| | 3 | 105 | 106 | 147 | 147 | 1000 | | 14.14 | 5.33 | 9.33 | |
| | | 107 | | 144 | | | | | | | |
| | | 105 | | 148 | | | | | | | |
| S15 | 1 | 112 | 111 | 149 | 149 | 1000 | 53.01 | 18.17 | 6.40 | 11.05 | 11.65 |
| | | 112 | | 149 | | | | | | | |
| | | 110 | | 149 | | | | | | | |
| | 2 | 110 | 110 | 148 | 149 | 1000 | | 19.67 | 7.65 | 12.07 | |
| | | 111 | | 151 | | | | | | | |
| | | 110 | | 147 | | | | | | | |
| | 3 | 110 | 111 | 149 | 149 | 1000 | | 19.39 | 7.95 | 11.84 | |
| | | 110 | | 149 | | | | | | | |
| | | 111 | | 149 | | | | | | | |

Example 2: Bond Strength

The bond strength between the three-dimensional concrete (beams, blocks) and barbed wires were determined. The bond strength was compared between cast block samples and three-dimension printed samples. The width, height, and length of the blocks used are 100 mm×90 mm×300 mm and composed of four beads in each horizontal layer and six layers over the depth. At one end, a barbed wire is embedded while on the other end a rebar is embedded. Testing consisted of using a universal testing machine to apply tension to the block held at one end by the wire and the other end by the rebar. This test was repeated at least three times for each configuration/variation to establish a mean and standard deviation.

The printing parameters included a pumping rate of 3.16 lit/min, a nozzle size of 1 inch (25.4 mm), a water flow rate of 800 kg/hour, a robot speed of 171 mm/sec, and a nozzle distance to bed of 15 mm. Barbed wires were cut into six 450 mm long barbed wires and straightened. To straighten the barbed wires, the wires were twisted by using a drill at one end and fixing the other end in a vise, in order to be consistent, the number of nodes between every two adjacent barbs was chosen to be six. Six rebars were cut into 275 mm long segments. A G-code was developed to simulate a 3D printed block by first importing the 3D geometry into the slicer Cura, which first exports G-code and then converts it into Rapid code used by the robot in Robot Studio (G-Code, Robot Studio). Lubricant (e.g., WD-40) was sprayed on the board surface (800 mm×150 mm board).

The first three layers were printed using the auto robot mode. The printing was temporarily cancelled to place the barbed wire and rebar. Printing subsequently resumed. The printed blocks were cured by spraying water and covering the sample for 24 hours. The printed blocks were measured (length×width×depth) before doing the mechanical tests. The material used was GCT, the temperature was 26° C., and the humidity was 71%.

For cast-in-place block samples, a plywood box was made to function as the mold. The box was open at both ends but had an interior web to properly hold the #4 rebar inside the mold. The rebar was inserted into the web (mid plate) and properly sealed before pouring concrete into the mold from the top part. The barbed wire was inserted from the top after concrete was poured and still fresh. The blocks were covered by plastic sheets and demolded after 6 days before mechanical test.

The barbed wire pull-out test was performed after 7 days of 3D-printing/casting the block specimens. The test setup is shown in FIG. 6. Tinius Olsen universal testing machine (materials test frame) was used to determine the tensile strength of the specimens. To do the test, the specimen was placed in the machine between the grips. 50 mm of barbed wire was cut to make its placement easier. To load the barbed wires into the tensile grip, a rebar #4 was also attached to it to be firmly held in the grip wedge (FIG. 6) and prevent eccentricity of the specimen during the test. The test consisted of applying tension to the block from the two ends by moving the tensile grips at a constant rate of speed. The maximum load that the specimen could resist before failure was measured.

For the cast block samples, two specimens were tested while the rebar was fixed to the top grip and the third specimen was tested when the barbed wire was firmly held in the top grip. For all three specimens, necking in the wire and failure took place close to a barb, which might be triggered by the internal stress caused by twisting action when the wires were straightened. The results of this test was in good agreement with the result of pure tensile tests of barbed wires (see Example 4). Table 2 tabulates the results of tensile strength tests. For cast blocks, the concrete specimen held the wire firmly and pulling the wire did not lead to any slip of wire from the block. Accordingly, the tensile bond strength between barbed wire and concrete would be larger than those of barbed wires displayed in Table 2.

TABLE 2

| Results of pull-out tests of cast in place blocks | | | | | |
|---|---|---|---|---|---|
| Tests# | Top Grip | Tensile Load (lbs.) | Tensile Strength psi | MPa | Failure pattern |
| 1 | Barbed wire | 1535.0 | 168127.1 | 1159.5 | Failure |
| 2 | Rebar | 1520.0 | 166484.1 | 1148.2 | occurred in |
| 3 | Rebar | 1500.0 | 164293.5 | 1133.1 | the wires |
| Average | | 1518.3 | 166301.6 | 1146.9 | (rupture) outside |
| std | | 17.6 | 1923.3 | 13.3 | of concrete block |

For 3D printed samples, the same test was run with the top grip holding the rebar and the bottom grip holding the barbed wire attached to an additional rebar (#4) (for better grip). Before conducting the test, the size of each specimen was measured with the results shown in Table 3. For all three specimens, the necking and failure happened near a barb. The results of this test was in good agreement with the results of pure tensile tests of barbed wires (see Example 4). Table 2 displays the results of tensile strength tests for cast blocks, where the concrete prism held the wire firmly and pulling the wire did not lead to any slip of wire from the block. Accordingly, the tensile bond strength between barbed wire and concrete would be larger than those of pure barbed wire tensile capacity displayed in Table 3.

TABLE 3

| Results of pull-out tests of 3D-printed blocks | | | | | | | | |
|---|---|---|---|---|---|---|---|---|
| Tests# | Top Grip | Concrete block dimension b | h | L | Tensile Load (lbs.) | Tensile Strength psi | MPa | Failure pattern |
| 1 | Rebar | 117.1 | 88.7 | 350.0 | 1580.0 | 173055.9 | 1193.5 | Failure |
| 2 | Rebar | 117.6 | 86.9 | 350.0 | 1560.0 | 170865.3 | 1178.4 | occurred in the |
| 3 | Rebar | 117.7 | 88.3 | 350.0 | 1500.0 | 164293.5 | 1133.1 | wires (rupture) |
| Average | | 117.5 | 88.0 | 0.6 | 1546.7 | 169404.9 | 1168.3 | outside of |
| std | | 0.3 | 1.0 | 0.0 | 41.6 | 4560.1 | 31.4 | concrete block |

Example 3: Bond Strength in the Transverse Direction

Using regular smooth wire for reinforcement could provide higher flexural strength compared to the unreinforced case for printed beams; however, it would not materially change the bonding strength between adjacent filaments. Without wishing to be bound to any particular theory, it is contemplated that using barbed wire increases the tensile bond strength between adjacent filaments in horizontal and vertical directions.

Figures 7, 8:
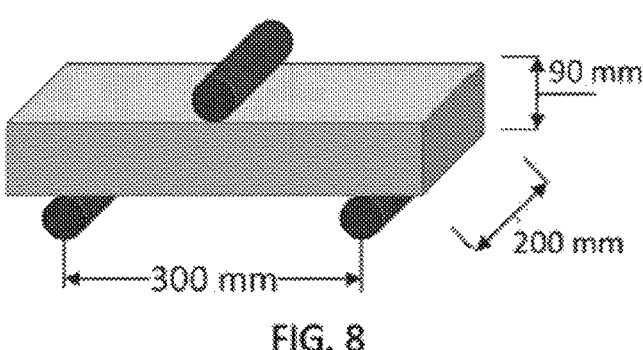
FIG. 7 are schematic illustrations of different configurations of reinforcement members positioned within composite materials in accordance with some embodiments of the present disclosure.
FIG. 8 is a three-point flexural test set-up used for determining flexural strength in accordance with some embodiments of the present disclosure.

The length and depth of the beams were, respectively, 300 mm×90 mm, composed of 12 beads in each horizontal layer and 6 layers over the depth. The width of the beams is a variable and changes for Set 1 and Set 2 of the tests in Example 3. Long beams were printed for each set of samples, and the samples were subsequently cut into shorter beams while the printed material was fresh (i.e., un-set or cured). For Set 1, initially a 300 mm×90 mm×1250 mm beam was printed, and then cut to 15 smaller beams (80 mm width). The length of the beam for Set 2 was 650 mm and after chopping it to 3 slices, each smaller beam had a width of 200 mm. The barbed wires prepared for Set 1 were 60 mm long with one barb at the mid-length while for Set 2, the wire is 180 mm long with 2 barbs. It should be noted that for both Sets, 25 mm from both ends of the long beams was also cut. The flexural test was repeated at least 3 times to establish a mean and standard deviation. The configuration of barbed wire arrangements in the cut beams are shown in FIG. 7.

The three-dimensional printed concrete was printed as follows: a pumping rate of 3.16 lit/min, a nozzle size of 1 inch (25.4 mm), a water flow rate of 800 Kg/hour, a robot speed of 180 mm/sec (60% of 300 mm/sec), and a nozzle distance to bed of 15 mm. The printing process included cutting 36 pieces of barbed wire for Set 1 (60 mm) and 36 pieces for Set 2 (180 mm). Similar to Examples 1 and 2, the barbed wires were straightened by using a drill at one end, while the other end was fixed in a vise and then twisting them; in order to be consistent, the number of nodes between every two adjacent barbs was chosen to be 6.

A G-code was developed to simulate a 3D printed block by writing the G-code within Excel. The code was then converted into Rapid code used by the robot in Robot Studio. A lubricant (e.g., WD-40) was sprayed on the board surface (for Set 1: 380 mm×1250 mm board and for Set 2: 380 mm×830 mm boards were prepared). The first layer was printed, thereafter, the robot arm was moved to the bucket after the auto robot-mode was canceled. Then the wires were placed manually according to configuration in which the barbed wires were oriented generally along the longitudinal, length dimension and parallel with adjacent barbed wires and with the barbs generally aligned in the lateral, width direction, and subsequently the printing process was resumed. The beams were sliced into smaller beams, and cured by spraying water and covering the samples for 24 hours. The size (length×width×depth) was measured before doing the mechanical tests.

The flexural strength tests were performed after 7 days of 3D-printing the samples. The force-deformation data was collected by considering the measured size of each beam, stress-strain curve of each case was developed. The test setup of flexural tests is illustrated in FIG. 8. The material was GTC, the temperature was 27° C., and 65% humidity.

As the samples were cut, their heights and widths were measured at three different points (close to the supports and at the mid-length of each beam) before conducting the flexural test. INSTRON 1350 universal testing machine (materials test frame) was used to determine the flexural strength and deformation of the beams in both sets. The length of each beam between the supports was set to be 250 mm. Table 4 shows the results of beam tests. The failure pattern of some of the beams are also illustrated in FIGS. 9(A-J). Flexural collapse occurred for all of the beams as they were not reinforced with any wires.

TABLE 4

Figure 9A:
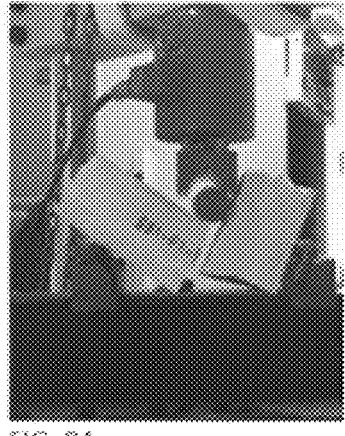
FIG. 9(A-J) are example images of failure patterns during flexural tests for the reinforced composite materials in accordance with some embodiments of the present disclosure.
Figure 9B:
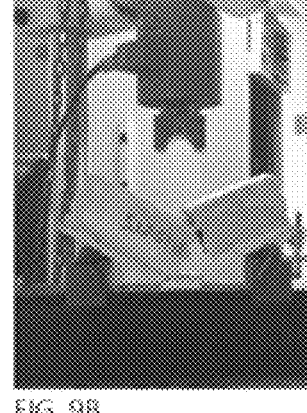
Figure 9C:
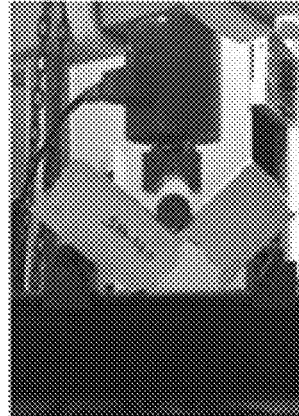
Figure 9D:
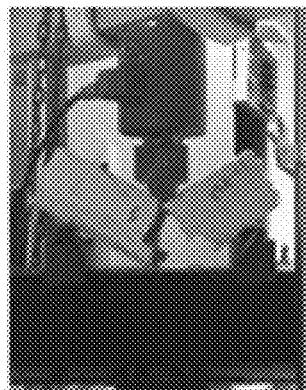
Figure 9E:

| | | Flexural test results of Set 1 | | | | | | |
|---|---|---|---|---|---|---|---|---|
| | | Width (mm) | | Depth (mm) | | Length (mm) | | |
| Beam # | | 3 points | Ave | 3 points | Ave | (between supports) | As (mm²) | Failure pattern |
| S31-S1 | 1 | 76 | 77 | 92 | 92 | 250 | 0.00 | FIG. 9A |
| | | 78 | | 93 | | | | |
| | | 77 | | 93 | | | | |
| | 2 | 83 | 85 | 90 | 90 | 250 | | |
| | | 87 | | 90 | | | | |
| | | 85 | | 90 | | | | |
| | 3 | 77 | 80 | 92 | 92 | 250 | | |
| | | 79 | | 93 | | | | |
| | | 83 | | 92 | | | | |
| S32-S1 | 1 | 78 | 78 | 81 | 80 | 250 | 5.89 | FIG. 9B |
| | | 78 | | 80 | | | | |
| | | 76 | | 79 | | | | |
| | 2 | 74 | 74 | 94 | 94 | 250 | | |
| | | 75 | | 95 | | | | |
| | | 74 | | 93 | | | | |
| | 3 | 79 | 80 | 94 | 93 | 250 | | |
| | | 80 | | 93 | | | | |
| | | 82 | | 92 | | | | |
| S33-S1 | 1 | 81 | 79 | 93 | 93 | 250 | 11.78 | FIG. 9C |
| | | 79 | | 94 | | | | |
| | | 77 | | 93 | | | | |
| | 2 | 76 | 76 | 95 | 95 | 250 | | |
| | | 78 | | 94 | | | | |
| | | 76 | | 94 | | | | |
| | 3 | 80 | 81 | 93 | 94 | 250 | | |
| | | 81 | | 95 | | | | |
| | | 83 | | 93 | | | | |
| S34-S1 | 1 | 78 | 78 | 93 | 92 | 250 | 17.67 | FIG. 9D |
| | | 78 | | 92 | | | | |
| | | 77 | | 93 | | | | |
| | 2 | 76 | 77 | 92 | 92 | 250 | | |
| | | 78 | | 93 | | | | |
| | | 78 | | 92 | | | | |
| | 3 | 76 | 77 | 91 | 91 | 250 | | |
| | | 76 | | 90 | | | | |
| | | 78 | | 92 | | | | |
| S35-S1 | 1 | 76 | 77 | 95 | 95 | 250 | 35.34 | FIG. 9E |
| | | 77 | | 96 | | | | |
| | | 78 | | 93 | | | | |
| | 2 | 79 | 75 | 89 | 91 | 250 | | |
| | | 74 | | 92 | | | | |
| | | 73 | | 91 | | | | |
| | 3 | 72 | 75 | 93 | 92 | 250 | | |
| | | 76 | | 92 | | | | |
| | | 78 | | 90 | | | | |

TABLE 5

Figure 9F:
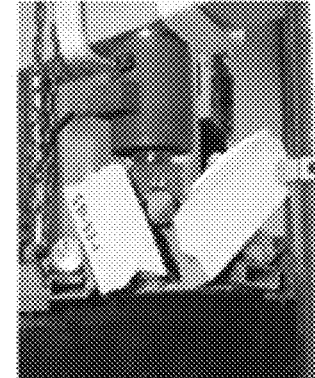

| | | Flexural test results of Set 2 | | | | | | |
|---|---|---|---|---|---|---|---|---|
| | | Width (mm) | | Depth (mm) | | Length (mm) | | |
| Beam # | | 3 points | Ave | 3 points | Ave | (between supports) | As (mm²) | Failure pattern |
| S31-S2 | 1 | 191 | 191 | 86 | 88 | 250 | 0.00 | FIG. 9F |
| | | 191 | | 90 | | | | |
| | | 190 | | 87 | | | | |

TABLE 5-continued

Flextural test results of Set 2

Figure 9G:
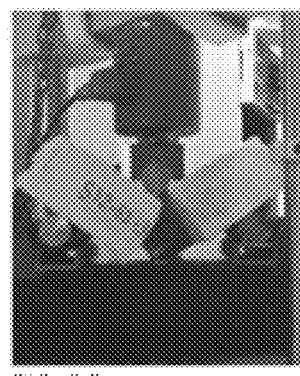
Figure 9H:
Figure 9I:
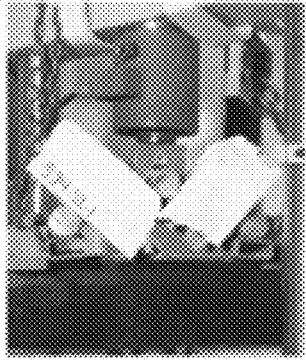
Figure 9J:

| Beam # | | Width (mm) 3 points | Ave | Depth (mm) 3 points | Ave | Length (mm) (between supports) | As (mm²) | Failure pattern |
|---|---|---|---|---|---|---|---|---|
| | 2 | 200 | 204 | 88 | 88 | 250 | | |
| | | 210 | | 90 | | | | |
| | | 202 | | 85 | | | | |
| | 3 | 200 | 201 | 90 | 88 | 250 | | |
| | | 201 | | 90 | | | | |
| | | 202 | | 86 | | | | |
| S32-S2 | 1 | 194 | 193 | 87 | 87 | 250 | 5.89 | FIG. 9G |
| | | 194 | | 88 | | | | |
| | | 192 | | 87 | | | | |
| | 2 | 196 | 195 | 87 | 87 | 250 | | |
| | | 196 | | 88 | | | | |
| | | 193 | | 87 | | | | |
| | 3 | 196 | 195 | 82 | 83 | 250 | | |
| | | 195 | | 85 | | | | |
| | | 194 | | 83 | | | | |
| S33-S2 | 1 | 193 | 196 | 85 | 84 | 250 | 11.78 | FIG. 9H |
| | | 197 | | 82 | | | | |
| | | 198 | | 85 | | | | |
| | 2 | 204 | 203 | 87 | 89 | 250 | | |
| | | 203 | | 91 | | | | |
| | | 203 | | 89 | | | | |
| | 3 | 199 | 199 | 83 | 85 | 250 | | |
| | | 199 | | 87 | | | | |
| | | 198 | | 85 | | | | |
| S34-S2 | 1 | 210 | 213 | 88 | 90 | 250 | 17.67 | FIG. 9I |
| | | 220 | | 91 | | | | |
| | | 210 | | 89 | | | | |
| | 2 | 196 | 197 | 90 | 89 | 250 | | |
| | | 196 | | 90 | | | | |
| | | 200 | | 88 | | | | |
| | 3 | 193 | 196 | 90 | 91 | 250 | | |
| | | 197 | | 93 | | | | |
| | | 199 | | 91 | | | | |
| S35-S2 | 1 | 194 | 195 | 85 | 85 | 250 | 35.34 | FIG. 9J |
| | | 195 | | 85 | | | | |
| | | 195 | | 85 | | | | |
| | 2 | 197 | 197 | 86 | 89 | 250 | | |
| | | 197 | | 91 | | | | |
| | | 198 | | 91 | | | | |
| | 3 | 199 | 201 | 91 | 91 | 250 | | |
| | | 201 | | 93 | | | | |
| | | 203 | | 89 | | | | |

Example 4: Direct Tension Tests of Barbed Wires

The pure tensile strength of the barbed wires were measured. Three extra twisted barbed wires and three normal barbed wires were cut to the desired length (500 mm) with three barbs. The wires were placed between the grips in the universal testing machine. The unsupported length of the wires was 250 mm. The results of maximum tensile force for the three measurements are shown in Tables 6 and 7. The necking and failure for all of the samples occurred close to the barbs.

The wires used for this experiments were 12.5-gauge wire (diameter of each wire=0.07626 inches), designed to unroll easily, and galvanized for rust prevention. Sharp four point barbs spaced every 5 inches along the wire. For both extra twisted and normal barbed wires, the failure occurred close to the barbs. The tensile strength of these two sets of wires were close, suggesting extra twisting of barbed wires to make them straight would not weaken them considerably.

TABLE 6

Results of Tension tests of extra-twisted barbed wires

| Tests# | Tensile Load (lbs.) | Tensile Strength psi | MPa |
|---|---|---|---|
| 1 | 1450.0 | 158808.9 | 1095.2 |
| 2 | 1475.0 | 161547.0 | 1114.1 |
| 3 | 1525.0 | 167023.1 | 1151.9 |
| Average | 1483.3 | 162459.6 | 1120.4 |
| std | 38.1 | 4182.5 | 28.8 |

TABLE 7

Results of Tension tests of barbed wires

| Tests# | Tensile Load (lbs.) | Tensile Strength psi | MPa |
|---|---|---|---|
| 1 | 1575.0 | 172508.2 | 1189.7 |
| 2 | 1430.0 | 156626.5 | 1080.2 |
| 3 | 1500.0 | 164293.5 | 1133.1 |
| Average | 1501.7 | 164476.1 | 1134.3 |
| std | 72.5 | 7942.4 | 54.8 |

Example 5: Different Beam Cross Sectional Area

Various three-dimensional geometries were printed in Example 5 with various cross sectional areas and geometric shapes (hollow, T shape, U shape, and solid). The flexural behavior of hollow core RC 3D-printed beams and printing factors (over extrusion vs. under extrusion) on the flexural strength of reinforced beams were investigated. The material was GCT, the temperature was 26° C., and the humidity was 65%.

Figure 10:
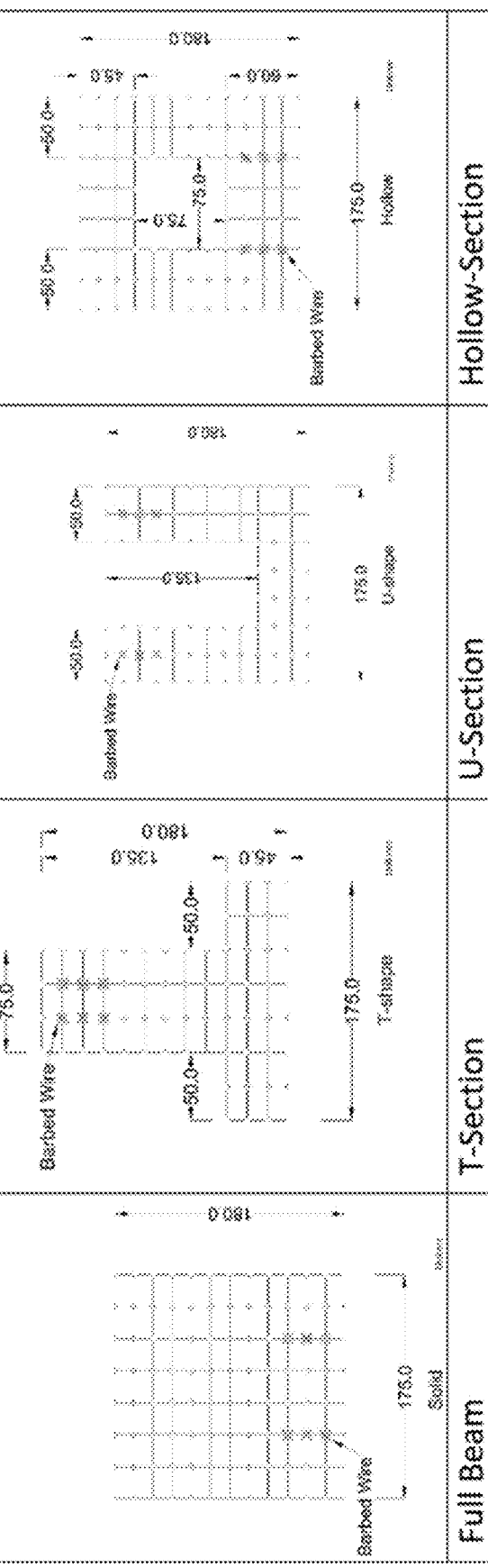
FIG. 10 are cross-sectional views of reinforced composite materials for different beam geometries in accordance with some embodiments of the present disclosure.

Four different cross sections were studied. The length, width, and depth of the full-section beams are, respectively, 1200 mm×175 mm×180 mm, consisting of 7 beads in each horizontal layer and 12 layers in the full depth. The cross section dimensions of other beams are shown in FIG. 10. All of these beams were reinforced according to the results collected in Example 1 (S13 configuration); However, as the cross section of these beams are larger than the beams printed in Example 1, their flexural behavior would be different depending on the ratio of $A_s/A_0$ ($A_s$ is the total area of wires and $A_0$ is the concrete area in each cross section). The amount of reinforcement ($A_s$) was similar for all four cases, and just the concrete surface area and accordingly $A_s/A_0$ ratio varies. The barbed wires were prepared following the instruction provided for Example 1. Mechanical test setup for Example 5 was also similar to Example 1. The Flexural strength test should be repeated at least twice to establish a mean and standard deviation. For the hollow section, the cavity was filled with expanding foam sealant to provide support needed to 3D-print the upper section of the beam.

One plain (no reinforcement) beam with a full section was tested to measure the maximum flexural strength of the plain 3D-printed concrete beam. Beams were cured for 24 hours after 3D-printing by spraying water and covering the specimen with a polyethylene plastic shroud for the first 24 hours. Number of wires was 48 and number of printed beams was 4×2=8. The printing parameters were as follows: a pumping rate of 3.16 lit/min (Dial 7), a nozzle size of 1 inch (25.4 mm), a water flow rate of 800 kg/hour, a robot speed of 165 mm/sec (55-60% of 300 mm/sec), and a nozzle distance to bed of 15 mm.

The extrusion speed was changed for printing of a 1200 mm×100 mm×150 mm beam (consisting of 4 beads in each horizontal layer and 10 layers in the full depth). The faster the 3D-printing speed, the larger voids formation between the filaments called inter-filament voids (linear voids between filaments). Moreover, the slower the speed of printing resulted in over extrusion, expansion of 3D-printed parts and not meeting the geometry requirements. The printing speed was set at 171 mm/sec, while for 3D-printing of under-extrusion beam, the speed was set at 225 mm/sec. The wire configuration was similar to Example 1 and S13 case. Printing set-up parameters were as follows: a pumping rate: 3.16 lit/min (Dial 7), a nozzle size of 1 inch (25.4 mm), a water flow rate of 800 kg/hour, a robot speed of 171 vs. 225 mm/sec (57% vs. 75% of 300 mm/sec), a nozzle distance to bed of 15 mm.

The depth and width of each beam were measured at three different points (close to the supports and at the mid-length of the beam). Table 9 displays the results of dimension measurement. Maximum bending load, deformation, and maximum flexural strength or module of rupture (MOR) are shown in Table 10.

28

TABLE 10

Flexural test results

| Beam ID | | Length (mm) (between supports) | As (mm²) | Max Load (KN) | Max Deformation (mm) | Maximum Flexural Strength or MOR | |
|---|---|---|---|---|---|---|---|
| F-WW-3 × 2 | 1 | 1000 | 35.34 | 19.00 | 7.57 | 4.92 | 4.92 |
| | 2 | 1000 | | 0.00 | 0.00 | | |
| F-NW | 1 | 1000 | 0.00 | 7.74 | 1.47 | 2.04 | 2.04 |
| | 2 | 1000 | | 0.00 | 0.00 | | |
| T-WW-3 × 2 | 1 | 1000 | 35.34 | 17.47 | 13.16 | 5.78 | |
| | 2 | 1000 | | 14.35 | 2.46 | 4.87 | |
| U-WW-3 × 2 | 1 | 1000 | 35.34 | 14.75 | 8.13 | 4.11 | |
| | 2 | 1000 | | 15.15 | 17.09 | 4.12 | |
| H-WW-3 × 2 | 1 | 1000 | 35.34 | 18.11 | 7.19 | 4.90 | |
| | 2 | 1000 | | 16.55 | 5.77 | 4.44 | |

Table 11 shows the results of flexural tests for two different extrusion speeds. The results indicated that under extrusion would lead to the formation of large inter-filament voids (linear voids between filaments), which can influence the mechanical properties of 3D-printed structures. The maximum flexural strength or MOR of the 3D-printed beam reduces 46% when fabricated at 225 mm/sec speed.

TABLE 9

Dimension measurement of different sections

| Beam ID | | Width 1 (mm) 3 points | Ave. | Width 2 (mm) 3 points | Ave. | Width 3 (mm) 3 points | Ave | Width 4 (mm) 3 points | Ave. | Height 1 (mm) 3 points | Ave. | Height 2 (mm) 3 points | Ave |
|---|---|---|---|---|---|---|---|---|---|---|---|---|---|
| F-WW-3 × 2 | 1 | 181 | 180 | | | | | | | 181 | 179 | | |
| | | 181 | | | | | | | | 179 | | | |
| | | 179 | | | | | | | | 178 | | | |
| | 2 | | | | | | | | | | | | |
| F-NW | 1 | 183 | 184 | | | | | | | 176 | 176 | | |
| | | 183 | | | | | | | | 175 | | | |
| | | 187 | | | | | | | | 176 | | | |
| | 2 | | | | | | | | | | | | |
| T-WW-3 × 2 | 1 | 83 | 83 | 201 | 202 | | | | | 125 | 127 | 45 | 45 |
| | | 83 | | 205 | | | | | | 130 | | 45 | |
| | | 83 | | 201 | | | | | | 127 | | 45 | |
| | 2 | 84 | 85 | 196 | 198 | | | | | 126 | 125 | 46 | 45 |
| | | 86 | | 202 | | | | | | 124 | | 44 | |
| | | 85 | | 197 | | | | | | 125 | | 46 | |
| U-WW-3 × 2 | 1 | 60 | 61 | 54 | 57 | 184 | 183 | 202 | 200 | 175 | 175 | | |
| | | 62 | | 58 | | 182 | | 197 | | 176 | | | |
| | | 61 | | 60 | | 183 | | 200 | | 174 | | | |
| | 2 | 60 | 62 | 60 | 60 | 182 | 183 | 198 | 193 | 178 | 177 | | |
| | | 62 | | 60 | | 185 | | 190 | | 177 | | | |
| | | 63 | | 60 | | 183 | | 191 | | 175 | | | |
| H-WW-3 × 2 | 1 | 191 | 189 | | | | | | | 177 | 175 | | |
| | | 186 | | | | | | | | 175 | | | |
| | | 189 | | | | | | | | 174 | | | |
| | 2 | 187 | 187 | | | | | | | 177 | 177 | | |
| | | 188 | | | | | | | | 176 | | | |
| | | 187 | | | | | | | | 178 | | | |

Note
F: Full Section;
T: T-Section;
U: U-Section;
H: Hollow-Section;
WW: with wire;
NW: no wire;
3 × 2: S13 configuration for wires

TABLE 11

| | | Width (mm) | | Height (mm) | | Length (mm) | | Max | Max Deform- | Maximum Flexural | |
|---|---|---|---|---|---|---|---|---|---|---|---|
| Beam ID | | (3 points) | Ave. | (3 points) | Ave. | (between supports) | As (mm²) | Load (KN) | ation (mm) | Strength or MOR (MPa) | |
| S13-225 | 1 | 102 | 100 | 150 | 151 | 1000 | 35.34 | 6.89 | 15.60 | 4.56 | 4.56 |
| | | 98 | | 151 | | | | | | | |
| | | 100 | | 151 | | | | | | | |
| | 2 | | | | | 1000 | | 0.00 | 0.00 | | |
| S13-171 | 1 | 114 | 114 | 146 | 147 | 1000 | 35.34 | 13.75 | 5.94 | 8.41 | 8.45 |
| | | 112 | | 147 | | | | | | | |
| | | 115 | | 147 | | | | | | | |
| | 2 | 106 | 106 | 148 | 149 | 1000 | | 13.30 | 5.54 | 8.52 | |
| | | 106 | | 149 | | | | | | | |
| | | 106 | | 149 | | | | | | | |
| | 3 | 113 | 113 | 149 | 151 | 1000 | | 14.36 | 5.38 | 8.41 | |
| | | 112 | | 151 | | | | | | | |
| | | 114 | | 152 | | | | | | | |

Flexural tests of beams 3D-printed at different extrusion speeds

The invention has been described according to one or more preferred embodiments, and it should be appreciated that many equivalents, alternatives, variations, and modifications, aside from those expressly stated, are possible and within the scope of the invention.

We claim:

1. A reinforced cementitious material comprising:
a cementitious material forming a geometric body comprising a plurality of printed filaments, including a first filament and a second filament that is directly bonded with the first filament such that the second filament is conformed with the first filament,
a reinforcement member disposed in the cementitious material between the first filament and the second filament when in the flowable state, the reinforcement member comprising:
(i) at least one elongate metal wire extending at least partially embedded in and extending along at least one of the first filament and the second filament, and
(ii) a plurality of barbs extending from the elongate metal wire in a transverse direction to the elongate metal wire so that a first barb of the plurality of barbs extends into the first filament and a second barb of the plurality of barbs extends into the second filament;
wherein the tensile bond strength is at least 500 MPa.

2. The reinforced cementitious material of claim 1, wherein the cementitious material comprises a cement binder, an aggregate, at least one pozzolanic additive, an accelerator, water, and nanoclay.

3. The reinforced cementitious material of claim 1, wherein the reinforcement member comprises a plurality of barbs along the length of the at least one elongate metal wire.

4. The reinforced cementitious material of claim 3, wherein the reinforcement member is disposed between a first printed filament and a second printed filament in the cementitious material, wherein the second printed filament is configured adjacent to the first printed filament, and wherein at least a portion of the plurality of barbs extend from the elongate metal wire to project into the second printed filament, and at least a portion of the plurality of barbs extend into the first printed filament.

5. The reinforced cementitious material of claim 3, wherein the barbs have a barb spacing from 1 cm to 50 cm.

6. The reinforced cementitious material of claim 1, wherein the barbs at least partially wrap around the at least one elongate metal wire.

7. The reinforced cementitious material of claim 1, wherein the reinforcement member comprises at least two elongate metal wires helically twisted along the length of the elongate metal wires.

8. The reinforced cementitious material of claim 7, wherein the at least two elongate metal wires comprise from 2 to 50 nodes between the barbs.

9. The reinforced cementitious material of claim 7, wherein some or all the barbs wrap between the at least two elongate metal wires.

10. The reinforced cementitious material of claim 7, wherein some or all the barbs wrap around the at least two elongate metal wires.

11. The reinforced cementitious material of claim 1, wherein the cementitious material completely surrounds the at least one elongate metal wire and at least one barb.

12. The reinforced cementitious material of claim 1, wherein the cementitious material comprises a plurality of the reinforcement members disposed therein.

13. The reinforced cementitious material of claim 1, wherein the reinforcement member comprises a curved structure within the cementitious material.

14. The reinforced cementitious material of claim 1 having one or more configuration selected from:
(i) from 2 to 500 rows of reinforcement members disposed within the composite material; or
(ii) from 2 to 500 columns of reinforcement members disposed within the composite material.

15. The reinforced cementitious material of claim 14, wherein the reinforcement members in the rows or columns are discontinuous as the reinforcements members extend along the length of the composite material.

16. The reinforced cementitious material of claim 1, wherein the tensile bond strength is at least 1100 MPa.

17. The reinforced cementitious material of claim 1, wherein the cementitious material has a final set time less than 300 minutes.

18. The reinforced cementitious material of claim 1, wherein the cementitious material has from 3 wt % to 20 wt % of at least one pozzolanic additive.

19. The reinforced cementitious material of claim 1, wherein the reinforced cementitious material has a 2-day tensile bond strength of at least 10 MPaS.

20. The reinforced cementitious material of claim 1, wherein the reinforced cementitious-material has a modulus of rupture of at least 1 MPa.

* * * * *